(12) United States Patent
Patterson et al.

(10) Patent No.: US 8,645,568 B2
(45) Date of Patent: Feb. 4, 2014

(54) VARIOUS METHODS AND APPARATUSES FOR A ROUTE SERVER

(75) Inventors: Lane Patterson, San Jose, CA (US); Marcelo Schmidt, Los Gatos, CA (US); Robert Hood, San Jose, CA (US); Jeffrey C. Rizzo, San Francisco, CA (US)

(73) Assignee: Equinix, Inc., Redwood City, CA (US)

(*) Notice: Subject to any disclaimer, the term of this patent is extended or adjusted under 35 U.S.C. 154(b) by 707 days.

(21) Appl. No.: 11/985,763

(22) Filed: Nov. 16, 2007

(65) Prior Publication Data

US 2009/0182896 A1 Jul. 16, 2009

(51) Int. Cl.
*G06F 15/173* (2006.01)

(52) U.S. Cl.
USPC ........... 709/241; 709/240; 709/242; 709/243; 709/244

(58) Field of Classification Search
USPC ......... 709/238, 239, 240, 241, 242, 243, 244; 370/401, 352, 238, 392
See application file for complete search history.

(56) References Cited

U.S. PATENT DOCUMENTS

| | | | |
|---|---|---|---|
| 6,151,629 A | 11/2000 | Trewitt | |
| 6,515,224 B1 | 2/2003 | Pedro | |
| 6,584,093 B1 * | 6/2003 | Salama et al. | 370/351 |
| 6,603,758 B1 | 8/2003 | Schmuelling et al. | |
| 6,665,702 B1 | 12/2003 | Zisapel et al. | |
| 6,912,567 B1 | 6/2005 | Allard et al. | |
| 6,971,029 B1 | 11/2005 | Avery, IV et al. | |
| 6,976,269 B1 | 12/2005 | Avery, IV et al. | |
| 6,976,296 B2 | 12/2005 | Boudreault | |
| 6,981,026 B2 | 12/2005 | Noda et al. | |
| 6,981,055 B1 * | 12/2005 | Ahuja et al. | 709/238 |
| 6,985,963 B1 | 1/2006 | Johnson et al. | |
| 7,139,728 B2 | 11/2006 | Rigole | |
| 7,577,154 B1 | 8/2009 | Yung et al. | |

(Continued)

FOREIGN PATENT DOCUMENTS

| | | |
|---|---|---|
| EP | 2218222 | 4/2011 |
| WO | WO 2009/064612 A1 | 5/2009 |

OTHER PUBLICATIONS http://www.internetsociety.org/publications/isp-column-may-2006-introduction-bgp-%E2%80%93-protocol "An Introduction to BGP—The Protocol"—May 2006 Internet Society.*
http://www.ripe.net/ripe/meetings/regional-meetings/manama-2006/BGPBCP.pdf "BGP Best Practices"—RIPE, Nov. 2006.*
"Netra t1 Systems LOMlite User's Guide,"Sun Microsystems, Inc., Part No. 806-2038-10, Revision A, Jul. 1999, pp. 1-8.
"Oracle FInancial Applications," Rochester Institute of Technology, vol. 1, Issue 7, Mar. 2001, pp. 1-7.
"Sun Enterprise™ 420R Server Owner's Guide," Sun Microsystems, Inc., Part No. 806-1078-10, Revision A, Oct. 1999, pp. 1-174.
Non-Final Office Action for U.S. Appl. No. 10/162,313 mailed Sep. 19, 2006, 4 pages.

(Continued)

*Primary Examiner* — Randy Scott
(74) *Attorney, Agent, or Firm* — Rutan & Tucker, LLP

(57) ABSTRACT

A method, apparatus, and system are described for a route server that connects network users to network providers. The route server may connect to network elements, including routers, from a plurality of Internet network service providers (ISP) to the network elements of a plurality of users through the route server. The route server also may make routing decisions for the plurality of users and the plurality of ISPs and is programmed to maintain multiple views of the routing table as well as implement multiple BGP instances, each instance representing different autonomous systems, in a single instance of the route server. The route server also may match a first user to one or more of the ISPs based on criteria including not only the best possible routes of each ISP but a full listing of all possible routes to a destination address from each ISP matching the user's criteria in order to construct a route table to get IP packets of a user to a destination address.

18 Claims, 7 Drawing Sheets

(56) References Cited

U.S. PATENT DOCUMENTS

| | | |
|---|---|---|
| 2001/0034704 A1 | 10/2001 | Farhat et al. |
| 2002/0010915 A1 | 1/2002 | Maeda |
| 2002/0019786 A1 | 2/2002 | Gonzalez et al. |
| 2002/0073182 A1 | 6/2002 | Zakurdaev et al. |
| 2002/0075813 A1* | 6/2002 | Baldonado et al. ........... 370/254 |
| 2002/0099616 A1 | 7/2002 | Sweldens |
| 2002/0129358 A1 | 9/2002 | Buehl et al. |
| 2002/0145981 A1* | 10/2002 | Klinker et al. ................ 370/244 |
| 2002/0178380 A1 | 11/2002 | Wolf et al. |
| 2003/0088696 A1* | 5/2003 | McCanne .................... 709/238 |
| 2003/0120769 A1* | 6/2003 | McCollom et al. .......... 709/224 |
| 2003/0172170 A1 | 9/2003 | Johnson et al. |
| 2003/0191841 A1* | 10/2003 | DeFerranti et al. ........... 709/226 |
| 2003/0236968 A1* | 12/2003 | Basu et al. ................... 712/225 |
| 2004/0044786 A1* | 3/2004 | Basso et al. ................. 709/238 |
| 2004/0098468 A1 | 5/2004 | Kang |
| 2005/0201302 A1* | 9/2005 | Gaddis et al. ................ 370/254 |
| 2006/0087977 A1* | 4/2006 | Tatman ........................ 370/242 |
| 2006/0101261 A1* | 5/2006 | Lee et al. ..................... 713/153 |
| 2007/0005954 A1 | 1/2007 | Skemer |
| 2008/0092229 A1* | 4/2008 | Khanna et al. ................. 726/15 |

OTHER PUBLICATIONS

Non-Final Office Action for U.S. Appl. No. 10/162,313 mailed Dec. 13, 2006, 9 pages.
Final Office Action for U.S. Appl. No. 10/162,313 mailed May 25, 2007, 10 pages.
Non-Final Office Action for U.S. Appl. No. 10/162,313 mailed Oct. 30, 2007, 11 pages.
Non-Final Office Action for U.S. Appl. No. 10/162,313 mailed Apr. 23, 2008, 9 pages.
International Search Report and Written Opinion, PCT/US2008/081476, mailed Feb. 6, 2009, 15 pp.
Written Opinion for European Patent Application No. EP08849351.5, mailed Jun. 30, 2010, 8 pp.
International Preliminary Report on Patentability for International PCT Patent Application No. PCT/US08/81476, mailed May 18, 2010, 12 pp.

* cited by examiner

VARIOUS METHODS AND APPARATUSES FOR A ROUTE SERVER

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to network communications. More particularly, an aspect of an embodiment of the invention relates to a route server connecting multiple users to multiple network providers.

BACKGROUND OF THE INVENTION

A variety of bandwidth providers may exist but some want long-term contracts and bandwidth minimum guarantees for an individual user to use their network services.

SUMMARY OF THE INVENTION

A method, apparatus, and system in which a route server connects network users to network providers. In an embodiment, the route server may have code programmed to connect to network elements, including routers, from a plurality of Internet network service providers to the network elements of a plurality of users through the route server. The route server also had code programmed to make routing decisions for the plurality of users and the plurality of Internet network service providers and then communicates these decisions to one or more of the plurality of Internet network service providers via Border Gateway Protocol. The route server also has code programmed to maintain multiple views of the routing table as well as implement multiple BGP instances, each instance representing different autonomous systems, in a single instance of the route server. The route server also has code programmed to match a first user to one or more of the Internet network service providers based on criteria provided by both the first user and the plurality of Internet network service providers including that the first user can select from not only the best possible routes of each Internet network service but a full listing of all possible routes to a destination address from each Internet network service matching the user's criteria in order to construct a route table to get IP packets of the first user to a destination address.

BRIEF DESCRIPTION OF THE DRAWINGS

The drawings refer to embodiments of the invention in which.

Figure 1:
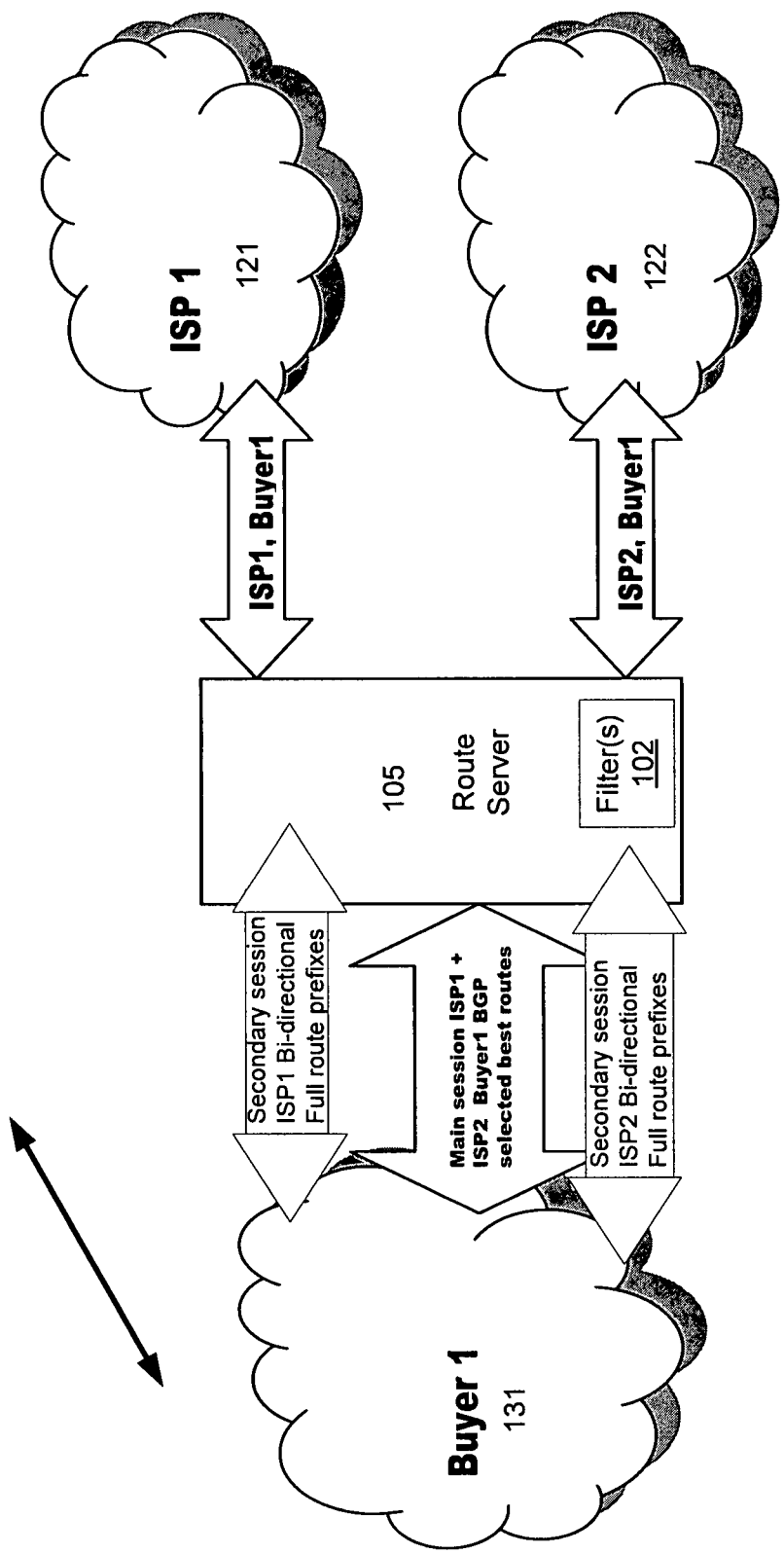
FIGS. 1 and 2 illustrate block diagrams of a route server connecting a plurality of Internet network Service Providers (ISPs) connected to a network to a plurality of users through the route server.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific algorithms, named components, connections, number of roots in a route table, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first ISP, may be made. However, the specific numeric reference should not be interpreted as a literal sequential order but rather interpreted that the first ISP is different than a second ISP. Thus, the specific details set forth are merely exemplary. The specific details may be varied from and still be contemplated to be within the spirit and scope of the present invention.

In general, a method, apparatus, and system are described in which a route server connects network users to network providers. In an embodiment, the route server may have code programmed to connect to network elements, including routers, from a plurality of Internet network service providers to the network elements of a plurality of users through the route server. The route server also had code programmed to make routing decisions for the plurality of users and the plurality of Internet network service providers and then communicates these decisions to one or more of the plurality of Internet network service providers via Border Gateway Protocol. The route server also has code programmed to maintain multiple views of the routing table as well as implement multiple BGP instances, each instance representing different autonomous systems, in a single instance of the route server. The route server also has code programmed to match each user to one or more of the Internet network service providers based on criteria provided by both that user and the plurality of Internet network service providers. The criteria can include that the user can select from not only the best possible routes of each Internet network service but a full listing of all possible routes to a destination address from each Internet network service matching the user's criteria in order to construct a route table to get IP packets of that user to a destination address. The route server allows additional peering sessions to each user so the user can receive these full listings in these sessions and have bidirectional communication with peers in these additional sessions.

Figure 2:
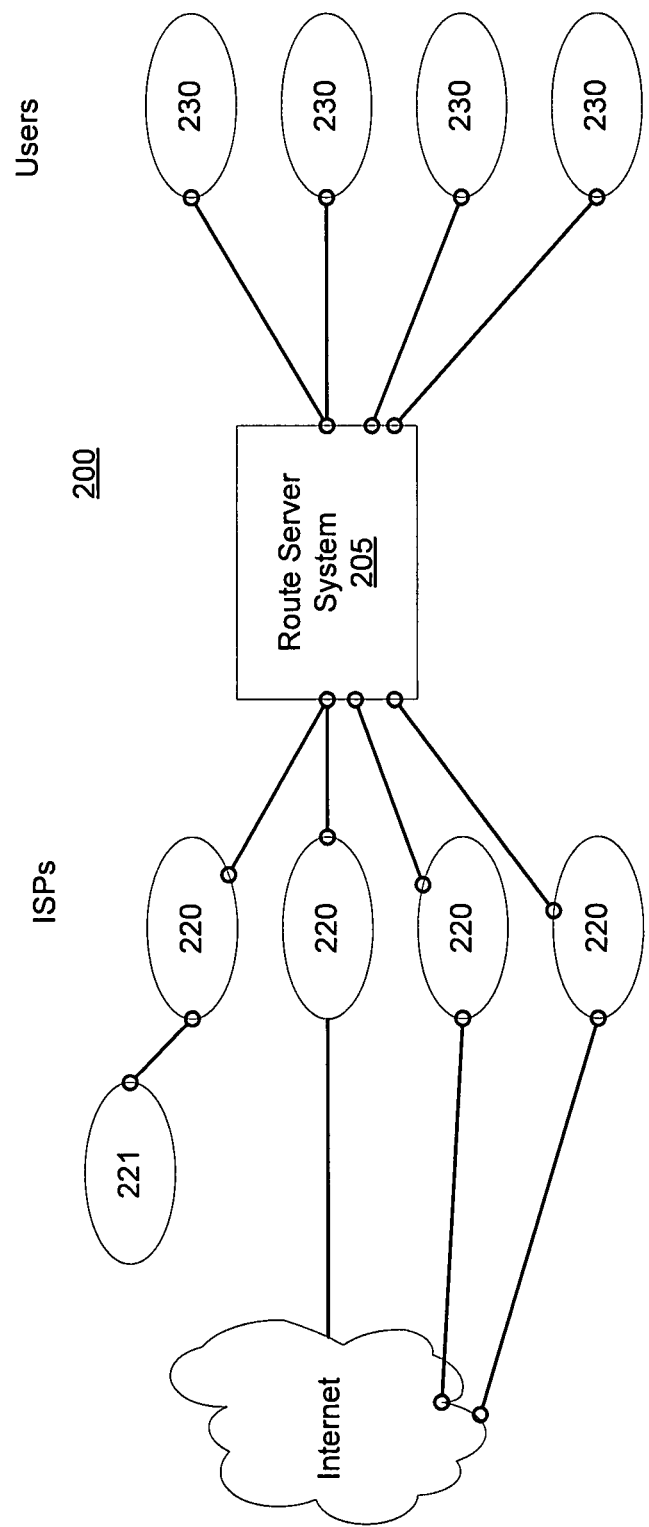

FIGS. 1 and 2 illustrate block diagrams of a route server connecting a plurality of Internet network Service Providers (ISPs) connected to a network to a plurality of users through the route server. The system may have one or more route servers 105, 205 that connect through one or more sessions with one or more users/buyers 131, 230, through a single connection into each user's network, and that connect to one or more ISPs 230, including ISP-1 121 and ISP-2 122.

Referring to FIG. 1, the route server 105 is different from a standard BGP router in how the route server 105 sees the global routing table. A standard BGP router maintains one view of the routing table—the same view the router uses to forward packets. The route server 105 maintains multiple views of the routing table. In an embodiment, the route server 105 then feeds a custom view of the routing table to each of its peers. Thus, the route server 105 maintains many-to-many multiple views of the routing table. Plus, a route server does not really do any traffic forwarding itself; that is the router's job. The route server 105 just tells the routers where the route server 105 thinks traffic should go via a mechanism such as a route table.

The route server 105 has code programmed to connect to network elements, including routers, from the multitude of Internet network service providers 121, 122 to the network elements of each of the users through the route server 105. The route server 105 also has code programmed to make routing decisions for the plurality of users 131 and the plurality of Internet network service providers 121, 122 and then communicates these decisions to one or more of the plurality of Internet network service providers (peers) 121, 122 via Border Gateway Protocol. For example, the route server 105 may generate a view of the route table to set the IP next-hop to the address of the router which the route server 105 has decided is the best path and that matches the user's criteria. The route server 105 also has code programmed to maintain multiple views of the routing table, such as each view the route server 105 wants each of its peers to see. The route server 105 also has code programmed to implement multiple BGP instances (each instance representing different autonomous systems) in a single instance of the route server 105. The route server 105 also has code programmed to match each user to one or more of the Internet network service providers based on criteria provided by both that particular user, such as buyer-1 131, and the plurality of Internet network service providers 121, 122. The criteria provided by both each user and the plurality of Internet network service providers can include that the each user can select from not only the best possible routes announced by each ISP but a full listing of all possible routes to a destination address from each Internet network service matching the user's criteria in order to construct a route table to get IP packets of the first user to a destination address.

The router server 105 implements Border Gateway Protocol such as BGP-4 to connect the users 131 to the ISPs 121, 122. The Border Gateway Protocol (BGP) is an interautonomous system routing protocol used between autonomous systems. An autonomous system can be a network or group of networks under a common administration and with common routing policies. BGP is used to exchange routing information for the Internet and is the protocol used between Internet service providers (ISP). User networks, such as universities and corporations, may connect to the multiple ISPs via the route server 105, and ISPs use BGP to exchange customer and ISP routes.

The BGP router server controls a many-to-many peering relationship, rather than the one-to-many of a typical router. The route server 105 gives a user the convenience of receiving a single BGP feed from each network element associated with the route server 105 no matter how many ISPs the user has selected.

Figure 3:
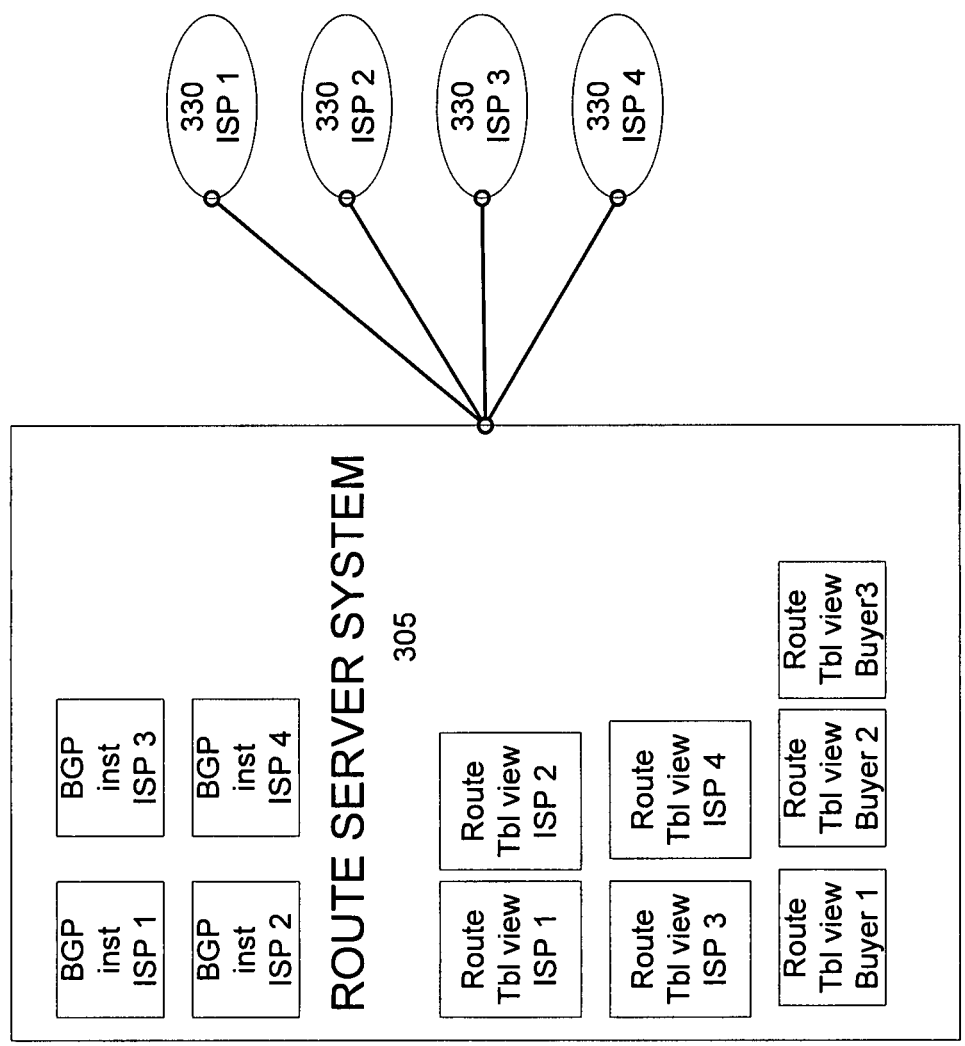
FIG. 3 illustrates a block diagram of a route server maintaining multiple views of the routing table and multiple instances of BGP in the same instance of the route server.

FIG. 3 illustrates a block diagram of a route server maintaining multiple views of the routing table and multiple instances of BGP in the same instance of the route server.

The route server 305 has code to support multiple instances of BGP talking to the same peers. Basically, the route server 305 can determine which IP address a neighbor peered with, and put the IP address in a different view accordingly. Placing the IP address in a different view, allows the route server 305 to send multiple different views of the routing table to a single peer. The route server 305 therefore allows a buyer to see the routing table from multiple upstreams simultaneously. Multiple "instances" of BGP can be run under the route server 305, where each BGP instance has its own Router ID, listens on a different IP address and TCP socket and all BGP instances are part of the same BGP Autonomous System Number.

Referring to FIG. 1, the route server 105 can also use the multiple instances of BGP for per-provider BGP sessions, where buyers can peer with a separate IP address and get merely those routes sent by a particular ISP provider. The following configuration snippet shows at an example basic level how it fits together. Note that this snippet is an example to show how BGP instances interoperate:

```
view isp-1
   class transit
   import buyer-1 class buyer-1
view isp-1-out
   import isp-1 transit
   class isp-1-per-prov
   prefix-map 10 buyer-1-list
   set add-class isp-1-per-prov
   set weight 65535
view isp-2
   class transit
   import buyer-1 class buyer-1
view isp-2-out
   import isp-2 transit
   class isp-2-per-prov
   prefix-map 10 buyer-1-list
      set add-class isp-2-per-prov
      set weight 65535
view buyer-1
   class buyer-1
   import isp-1 class transit
   import isp-2 class transit
view buyer-1-isp-1
   import isp-1 class transit
view buyer-1-isp-2
   import isp-2 class transit
router bgp main 65500 192.168.1.14/24 default
   bgp router-id 192.168.1.14
   neighbor 192.168.1.15 remote-as 65501
   neighbor 192.168.1.15 view isp-1
   neighbor 192.168.1.16 remote-as 65502
   neighbor 192.168.1.16 view isp-2
   neighbor 192.168.1.17 remote-as 65503
   neighbor 192.168.1.17 view buyer-1
router bgp isp-1 65500 192.168.1.13/24
   bgp router-id 192.168.1.13
   neighbor 192.168.1.17 remote-as 65503
   neighbor 192.168.1.17 view buyer-1-isp-1
router bgp isp-2 65500 192.168.1.12/24
   bgp router-id 192.168.1.12
   neighbor 192.168.1.17 remote-as 65503
   neighbor 192.168.1.17 view buyer-1-isp-2
! prefix list buyer-1-list
ip prefix-list buyer-1-list 10 permit 192.168.1.17.0/24
```

The above configuration sets up a BGP session with ISP1 121, a BGP session with ISP2 122, and three discrete BGP sessions with Buyer-1 131. The primary BGP session (from the buyer-1 view, in the main instance of BGP) communicates a mix of routes from ISP1 and ISP2, and takes routes from Buyer-1 131 and sends them to ISP1 121 and ISP2 122. The other bidirectional secondary BGP sessions, in the isp-1 and isp-2 instances, send not only the best routes from ISP1 121 and ISP2 122, respectively but the full route prefixes for each peer. Thus, bidirectional secondary sessions are opened between the user clients and the route server 105 as well as the peers and the route server 105. The user clients and peers can announce back to the route server 105 full route prefixes for each peer using the same session rather than using separate sessions to obtain full route prefixes of each autonomous system. Users may select from not only the best possible route but a full listing of all possible routes to a destination address for the IP packets from each providers matching the user's criteria.

Each user's supplied criteria may then include a subset of the possible Internet network service providers the user wishes to receive a full listing of all of the possible routes from. The route server 105 brings the up one or more additional BGP peering sessions between the route server 105 and the network elements of each user to receive full transit routes from each Internet network service providers in the subset that that particular user has selected. The additional BGP peering sessions establish bidirectional communications between the route server 105 and the network elements the each user. The BGP peering session allows both the route server 105 and the network elements of the user to send traffic directly to and from each other rather than via an ISP. A particular user is able to announce different information to one or more of the ISPs back through the additional BGP peering sessions than the information announced back through a main BGP peering session. The remainder of on-net providers always provide the merely the best route to their own networks.

In an embodiment, the user can have the route server 105 apply various filters 102 to the listing of full route prefixes in order to reduce the amount of unwanted route prefixes presented to the user from a particular ISP. The route server 105 applies these different types of filters 102 on these full transit routes to either filter in, filter out, or filter in and out particular route prefixes from the full transit routes. The filters 102 can be based on users' criteria for filtering network transit paths such as route-maps, as-path, prefix-list filters, 3rd party route authorization databases, classes of services, or similar criteria. Thus, the user and the route server 105 may establish per-provider BGP peering sessions. The per-provider BGP peering sessions feature in which full listing of all possible routes to a destination address or a filtered version of the full listing is available for only the transit ISP providers that the user has selected.

The full set of prefixes can be filtered by comparing announced prefixes from a particular ISP to a third party route authorization databases recording the rights to announce a parties prefix number. Thus, the route server 105 will not accept an announced route that a first ISP announces when the rights to that route belong to another ISP according to the third party route authorization database.

The per-provider BGP sessions can allow a buyer to both control to who and what he announces to each provider, and what a buyer receives from each provider. This provides separate control of routing policy impacting inbound traffic and outbound traffic. The user can announce one thing to provider A and the same buyer can announce another thing to provider B Egress traffic is typically influenced by engineering Local-Pref among the user's per-provider feeds. The users can use the additional peering sessions to influence their egress and ingress traffic. Ingress traffic is typically influenced by engineering AS PATH length announcements to the user's per-provider sessions. The user's routers need to support the added load and memory requirements to handle storing full Internet routes from one or more selected ISPs over the additional BGP session feeds. In an embodiment, the subset of ISP providers selected by a user may be up to three configured per-provider BGP sessions. These per-provider BGP sessions use the same peer ASN as the user's main BGP sessions. Each user's per-provider BGP session for a particular ISP Provider may not come up until the user's bandwidth to that Provider has been activated and raised to a sufficient level. The route server 105 communicates the IP addresses that correspond to the selected ISP Providers to the users. After that, each user may add the new BGP sessions and configure the appropriate route filters 102 in order to enable the per-provider feature. The users could specify a subset of the full Internet BGP route table if for example their router is short on memory.

As discussed, Typical BGP routing updates advertise only the optimal best path to a destination network to the users but the route server 105 can advertise all of the possible paths to a destination network to a user. BGP is a very robust and scalable routing protocol. Internet BGP routing tables may include a full listing of more than 120,000 routes. To achieve scalability at this level, BGP uses many route parameters, such as attributes, to define routing policies and maintain a stable routing environment. Each interdomain may advertise routes to its BGP peers. BGP neighbors exchange full routing information when the TCP connection between neighbors is first established. Generally, when changes to the routing table are detected, the BGP routers send to their neighbors only those routes that have changed.

The route server 105 uses BGP's best path feature as well as user supplied and ISP provider supplied criteria to determine the best matching path selection for the IP packet traffic from the users. BGP could possibly receive multiple advertisements for the same route from multiple ISP sources. The user supplied and ISP provider supplied criteria are compared to determine, which possible paths should be evaluated. BGP then generally selects only one path as the best path to put into the routing table. When the path is selected, BGP puts the selected path in the IP routing table and propagates the path to its neighbors. The BGP code can use example network criteria, such as Weight, Local preference, Multi-exit discriminator, Origin, AS_path, Next hop, etc., to select a path for a destination. Once the import statements have decided what routes are available to be announced to peers in a given view, the selection algorithm must still run to determine which version (if there are more than one) of a route is sent. The selection algorithm may be as follows:

1) Check that the next-hop field is in the correct subnet for the BGP instance of the neighbor it was received from. If not or if a next hop that is inaccessible, remove the route from consideration.
2) If the route is damped (i.e. BGP damping), do not consider the route.
3) Prefer the path with the largest WEIGHT.
4) If multiple routes have the same WEIGHT, compare the metrics AS_PATH, MONETARY_COST, PACKET_LOSS, AVERAGE_RTT and JITTER in the order defined by bgp best path order.
5) If all above metrics are the same, prefer the route with the lowest MULTI_EXIT_DISC, provided that all candidate routes are from the same neighboring AS. (unless bgp always-compare-med is set, in which case compare regardless of whether the neighbor AS is the same).

6) If all else is equal, prefer the route that was received first, unless bgp best path compare-routerid is set, in which case, prefer the route with the lowest BGP router ID.

As inferred above, routes learned via BGP have associated properties that are used to determine the best route to a destination when multiple paths exist to a particular destination. These properties include BGP attributes used in the route selection process with example attributes described below.

Weight is a Cisco-defined attribute that is local to a router. If the router learns about more than one route to the same destination, the route with the highest weight will be preferred. The local preference attribute is used to prefer an exit point from the local autonomous system (AS). If there are multiple exit points from the AS, the local preference attribute is used to select the exit point for a specific route. The multi-exit discriminator (MED) or metric attribute is used as a suggestion to an external AS regarding the preferred route into the AS that is advertising the metric. The origin attribute indicates how BGP learned about a particular route. The origin attribute can often one of three possible values: the route is interior to the originating AS; the route is learned via the Exterior Border Gateway Protocol (EBGP); and the origin of the route is unknown or learned in some other way. AS path attribute indicates when a route advertisement passes through an autonomous system, the AS number is added to an ordered list of AS numbers that the route advertisement has traversed. The next-hop attribute is the IP address that is used to reach the advertising router. For EBGP peers, the next-hop address is the IP address of the connection between the peers. For IBGP, the EBGP next-hop address is carried into the local AS. The community attribute provides a way of grouping destinations, called communities, to which routing decisions (such as acceptance, preference, and redistribution) can be applied. Route maps are used to set the community attribute. The code makes the update process prefer existing advertisements, if all other metrics are equal. This would generally prefer the peer that advertised the route first. The route server 105 uses the above attributes as well as other parameters to determine a best route. In some cases, the seemingly same route will be sent to a peer twice. This is because the route server is using hidden metrics that the peers cannot see. If the route server sends a specific announcement to a peer because its route is the best choice, then something changes that announcement's metric, but that peer's route is still the best choice, the route will be re-advertised. This is because the route server thinks the route is a new announcement with different metrics.

Referring to FIG. 3, the route server 305 can also implement multiple BGP instances (representing different autonomous systems) in a single instance of the route server 305. The route server 305 supports multiple instances of BGP, and each instance can be listening on a separate IP address and BGP port. The route server 305 checks for new peers BGP Neighbors to add, and for peers which have been unconfigured to remove. This is the largest set of checks done by read_reconfig( ). The route server 305 checks for new views, removed views, and imports for which the view is (now) missing.

On BGP ports, a listener channel is allocated for each because the route server 305 can have multiple BGP instances. When the route server 305 detects that a BGP instance is unconfigured, the associated listener is be closed. In an embodiment, the read_reconfig( ) routine of the route server 305 loops through all the BGP instances, allocating a channel and opening a listener for any BGP instance that doesn't already have one. After that, the read_reconfig( ) routine of the route server 305 loops through the channels looking for open BGP listeners without a BGP instance in the configuration, and closes those.

BGP Neighbors

The read_reconfig( ) routine of the route server 305 loops over each BGP instance, and over each BGP neighbor in each instance. In an embodiment, the read_reconfig( ) routine of the route server 305 checks each configured neighbor:

If the neighbor does not exist in the peer table already, a new slot is allocated for the BGP neighbor, and the peer is initialized. All the following steps are also taken.

If BGP_FLAGS_DECONFIG is set for the peer, the peer is marked for hard reset, and the flag is unset.

If the neighbor is configured as shutdown, the peer is marked for shutdown as well. If the peer was not already in administrative shutdown, mark the peer for hard reset. If the neighbor is not configured for shutdown, clear the peer's shutdown flag, and if the peer was shutdown, put it in BGP_STATE_IDLE.

Check if the neighbor is configured as passive. If so, set the peer's passive flag. If not, clear the peer's passive flag. Note that since this flag does not require a reset of the peer, it is just as easy to set or clear the flag as it is to check if the flag is set or clear. Easier, in fact, because the route server 305 does not have to perform both actions (check and change) to change it if necessary.

Check if the neighbor is configured as 'fake' (debug for 'fake' neighbors). If so, set the appropriate flags on the peer. If not, and the peer was fake, clear the BGP_FLAGS_FAKE and mark the peer to be hard reset.

Check if the neighbor is set to not have communities sent. If the peer is set differently, it must be marked for hard reset. (Soft reset does not re-send routes—it lets the update thread determine if routes need to be re-sent.)

Check if the neighbor is set for no transparent-as. If the peer is set differently, the peer is marked for hard reset. (Soft reset does not re-send routes)

Check if the neighbor's AS number has changed. If so, change the peer's AS number, and mark it for hard reset.

Copy the view name and BGP instance name from the configured neighbor to the running peer.

If the BGP instance we are in is marked as the default, set BGP_FLAGS_ON_DEFAULT for the peer, otherwise clear it.

Check the neighbor's weight—if it is different than the peer's, change the peer's default weight to match, and mark the peer for a soft reset.

Copy the hold time and keepalive interval to the peer's configured hold time and keepalive interval. (Note, not the active ones).

Check the neighbor's maximum prefix setting—if its different than the peer's, change the peer's setting, and mark the peer for a soft reset.

If the peer is marked for hard reset, and is not in BGP_STATE_IDLE, call bgp_change_state_external( ) on the peer, and set its state to BGP_STATE_CLEANUP.

Otherwise, if the peer is marked for soft reset, send RCOMMAND_CLEAR_SOFT to the route thread for the current peer.

Once this loop is complete, the read_reconfig( ) routine of the route server 305 loops over the peer table looking for peers, which have been removed in the config. When the read_reconfig( ) routine of the route server 305 finds one, the read_reconfig( ) routine of the route server 305 sets BGP_FLAGS_DECONFIG for the peer, and calls bgp_change_state_external( ) to change its state to BGP_STATE_CLEANUP.

Figure 4:
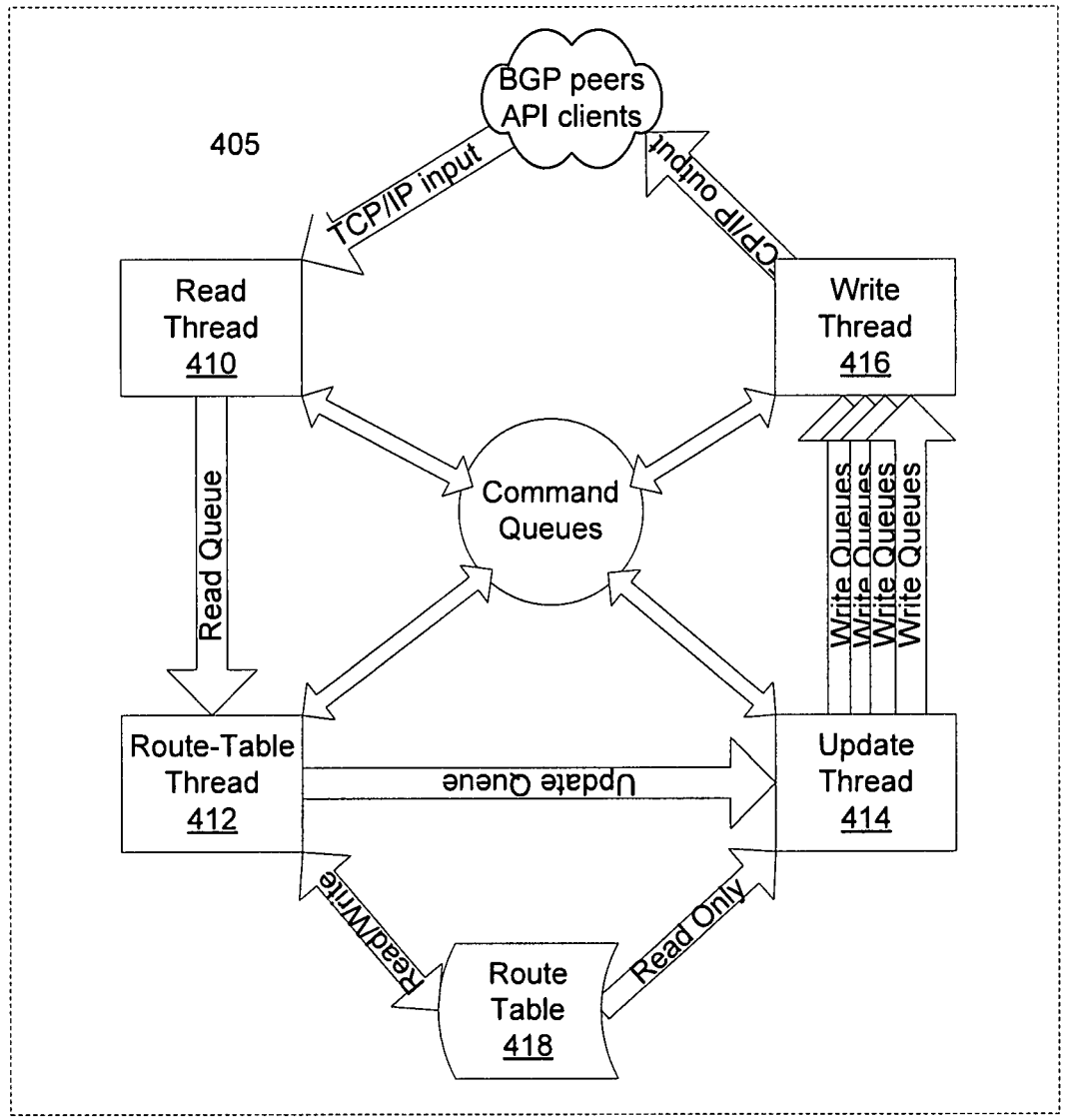
FIG. 4 illustrates a functional block diagram of an embodiment of a multiple threaded daemon in the route server.

FIG. 4 illustrates a functional block diagram of an embodiment of a multiple threaded daemon in the route server. The route server 405 is designed as a multiple threaded daemon. The route server 405 consists of a main thread and four or more independent persistent threads, which handle tasks such as reading, writing, route table management, SNMP, and BGP update processing. In an embodiment, the daemon may have persistent threads of a read thread 410, a write thread 416, a route table thread 412, and a BGP update thread 414. The daemon is a computer program that runs in the background, rather than under the direct control of a user. The route server 405 is designed as a multithreaded daemon that runs on POSIX compliant systems which support POSIX threads. POSIX threads use a common standard to define an API for creating and manipulating threads. Libraries implementing the POSIX Threads standard are often named Pthreads. Pthreads define a set of C programming language types and procedure calls.

At startup time, when the route server 405 itself initially starts, usually, the daemon should be run from its wrapper script. The wrapper script starts the route server 405 with the default configuration, and also handles such things as restarting the daemon if the daemon quits unexpectedly, and compressing and copying off any core file which might be generated from a crash, for debugging purposes. While the daemon runs, the daemon may implement a BGP state machine in accordance with Request For Comments 1771. The main thread is that which is started at the command line when the route server 405 is first run. The main thread launches all the other independent persistent threads. Once the other independent persistent threads are launched, the main thread merely wakes up all other threads once per second. The main thread also rolls the log files when necessary, and outputs periodic statistics when DEBUG_STATS is set.

During run time, the daemon implements the BGP state machine using the independent persistent threads. Specifically, the read thread 410 handles all the TCP traffic from peers, the update thread 414 handles advertisements and withdrawals (and keepalives), the write thread 416 sends the actual packets to peers, and the route table thread 412 is responsible for maintaining the integrity of the single route table 418 which is maintained for all peers by being the only persistent thread with both read and write access to the route table. The route table thread 412 is the only persistent thread that can write into the route table 418 in order to allow fast access by all threads to the route table 418 by allowing the other independent persistent threads the ability to read from the route table 418 at the same time and not having to lock threads because only the route table thread 412 can make changes to the route table 418. The route server 405 uses a pre-emptive thread implementation to ensure the entire daemon does not hang or stall while one of the other independent persistent threads is waiting for something like a data response to happen.

The four persistent independent threads 410-416 communicate with each other via Queue structures passed between each other. Thus, communication between the threads is accomplished with queues and condition variables and then the queues are pipelined and use flags to achieve scalability. One thread will place something in a queue (the read queue, the route command queue, the update queue, or a write queue) to be acted upon by the recipient thread. The route server 405 uses the POSIX thread (pthread) API. Condition variables (of type pthread_cond_t) are used to "signal" a thread that is waiting upon that condition. The route server 405 uses these to "wake up" sleeping threads For example, the main thread wakes up the other persistent independent threads once per second.

Read Thread

The read thread 410 is responsible for accepting new TCP connections, receiving data from TCP connections, and detecting failed connections. (in this context, "connection" means either a BGP peer, or a management connection). The read thread 410 also runs the command and configuration parsers, and is responsible for maintaining the channel array. Like the other persistent threads in the route server 405, the body of the read thread 410 is implemented in a function called read_thread( ), and consists of an endless loop performing certain operations. The read_thread( ) performs the following example steps:

A. The read thread 410 figures out which channels might have data to read. This is done by using two fd_sets (one for reads, one for errors) to mark those channels which are not log channels, are active, are not disallowing input, and (if the channel is a BGP channel) the read queue is not over the route server_READQ_MAX. Any eligible channel's socketid is added to the fd_sets.

B. The read thread 410 uses an non-blocking select( ) to find out which of the eligible channels has data read to read.

C. The read thread 410 loops through each channel, checking if it is one of the channels with pending data, and handling daemon channels (CHFLAG_ADMIND, CHFLAG_BGPD) separately.

D. The read thread 410 handles input for admin channels and BGP channels. For admin channels, some basic sanity checking is done—if the read fails or returns zero, the channel is closed. If not, up to PACKET_LEN bytes are read into the channel's current_read packet. For BGP channels, different sanity checking is done, and then the packet is read into current_read as well. If the packet in current_read is a valid-looking BGP packet, it is put into the read queue for the route table thread 412 to operate on.

E. Finally, the read thread 410 loops through each channel again and close those channels which are eligible for closure.

Write Thread

The write thread 416 is responsible for delivering data packets to peer connections. Thus, the write thread 416 delivers data queued for each channel (by channel_write( )) to its associated socket.

In the main loop of write_thread( ), the following steps are performed:

1. Clear writefds (an fd_set of file descriptors which are ready to write), and the flag which indicates at least one descriptor is ready.
2. Acquire a read lock on the channel table, so it doesn't change out from under us.
3. Loop through each channel in the table, doing the following:
   If the channel is closed, clean up any leftover data in the write queue.
   If the channel has no data in current_write, but there is data in the write queue, de-queue the first packet and place it in current_write.
   If there is data in current_write for the channel, set the flag and add the current channel's file descriptor to writefds.
4. Once the channel loop is complete, select( ) on writefds for writing, with a timeout of 0. When select( ) returns, loop through the channel table again, and issue a write_queue( ) for each channel whose socketid is in writefds. (The function write_queue( ) attempts to write all the data in the channel's write queue. If it fails to write all data, the data is left to be written next time)
5. Release the read lock on the channel table.
6. Wait for the condition variable write_cond.

The write thread 416 loops through the above steps indefinitely.

Route Table Thread

The route table thread 412 is the main workhorse of the route server 405. The route table thread 412 is the only persistent thread with both read and write access to the route table. The route table thread 412 is responsible for BGP issues and updating the route table 418 based on BGP UPDATE packets. The route table thread 412 creates lists of routes to be used by the update thread 414 for sending out BGP updates. The route table thread 412 is also responsible for removing old routes, after letting the withdrawal announcements get out. When the route table thread 412 receives a route change, the route table thread 412 creates a new route table entry, optionally flags an old entry for removal, then creates a change request that is queued and sent to the update thread 414. Also, this thread can receive notices from other threads to deal with peer establishment and peer drops. This thread must create a change request that contains all of the available prefixes. The route table thread 412 creates and updates one or more structures that contain all of the pointers necessary for the update thread 414 to do its work. That way, the update thread 414 will not have to search for the routes every time.

In an embodiment, the workflow of the route table thread 412, as implemented in the function route_thread( ) in the file route.c is basically as follows:
1. process any commands in the command queue;
2. process up to 1000 BGP packets in the read queue;
3. add the current RouteList to the update queue for processing, throttling for one second if the update queue has more than the route server_UPDATEQ_MAX entries already;
4. scan the table of BGP peers, checking the following for each peer:
   send a keepalive if necessary,
   check the hold timer, and send a notification if expired,
   check for peer timeout during open negotiation,
   initiate connection to peers in BGP_STATE_IDLE,
   finalize shutdown for peers in BGP_STATE_CLEANUP;
5. Run the garbage collector if it's been more than the route server_GARBAGE_COLLECTION_TIME seconds since the last run;
6. Run route_dampening( ) if it's been more than the route server_DAMPENING_TIMER seconds since last run; and
7. Check maximum prefix settings on peers.

The following discussion examines each one of these operations in turn to see what they're doing.

1. Process Commands

The commands being processed by the route table thread 412 are sent to it via the route_command queue from the other threads. From time to time, another thread may require something to be written to the route table, or something else which must be done under the control of the route table thread 412, so the other thread sends the information to the route table thread 412 via a command, and the route table thread 412 does the actual work. The commands which can be sent are all prefixed with RCOMMAND, and defined in a route table:

define RCOMMAND_SHOW_IP_ROUTE 3
define RCOMMAND_SHOW_IP_ROUTE_SUMMARY 4

-continued define RCOMMAND_SHOW_IP_BGP_NEIGHBORS 5
define RCOMMAND_CHANGE_STATE 6
define RCOMMAND_FORCE_GC 7
define RCOMMAND_SET_RTT 8
define RCOMMAND_SET_JITTER 9
define RCOMMAND_SET_COST 10
define RCOMMAND_SET_LOSS 11
define RCOMMAND_CLEAR_SOFT 12
define RCOMMAND_CLEAR_DAMP 13

Each of these commands causes one or more functions to be called and run in the context of the route table thread 412. The commands are broken down by function as follows:
  RCOMMAND_SHOW_* commands which cause output to go to an administrative login. Causes the route table thread 412 to generate read-only pointers into the route table.
  RCOMMAND_CHANGE_STATE which changes the BGP state of a given peer
  RCOMMAND_FORCE_GC which causes the route table thread 412 to run garbage collection even if the route server_GARBAGE_COLLECTION_TIME seconds has not yet passed. This is used to enact changes caused by a reconfiguration.
  RCOMMAND_SET_* commands which cause parameters to be set on particular routes
  RCOMMAND_CLEAR_SOFT, which causes the route table for a particular peer to be rescanned
  RCOMMAND_CLEAR_DAMP, which causes the BGP damping information for a particular view or route to be cleared.

The route table thread 412 only processes one command per iteration of its loop—commands from other threads should be much less frequent than, say, BGP packets.

2. Process BGP Packets

Once the route table thread 412 has checked for pending commands, the route table thread 412 processes pending BGP packets from the read queue. In order to ensure that the route table thread 412 has enough cycles to process the peer table (for keepalives, etc.), it limits the maximum number of packets processed at one time to the route server_READQ_PROCESS packets, which at the time of this writing is set to 1000. (the read thread 410, which queues the packets in the read queue, will throttle when there are the route server_READQ_MAX packets—this is set to 2000 by default) The code within route_thread( ) itself simply loops up to the route server_READQ_PROCESS times, retrieving a packet from the read queue, calling bgp_process_packet( ) on each successive packet, then recycling that packet by calling read_recycle_packet( ). The bulk of the work on the packet is done by the function bgp_process_packet( ), which is defined in the file bgp.c. bgp_process_packet( ) is a fairly simple function; it checks the "type" field of the packet (for example the 19th byte In accordance with RFC 1771), and then handles the packet accordingly.

The four type codes which are defined in RFC1771 are as follows:
1. BGP_PACKET_OPEN—call bgp_process_open( ) on the packet.
2. BGP_PACKET_UPDATE—check if the peer from which the update was received is established. If not, silently drop the update. If so, pass the packet to bgp_process_update( ).
3. BGP_PACKET_NOTIFICATION—we got a notification from this peer, so log the message which was sent, increment the number of notifications seen from the peer, and start the process of closing the channel the peer was on by calling channel_close_start( ).

4. BGP_PACKET_KEEPALIVE—if the peer exists, increment the number of keepalives seen from this peer, then handle the packet depending on which state the peer is in. If the peer doesn't exist (which can happen if another thread has closed the channel), simply ignore the packet.

3. Send Current RouteList to the Update Queue

In an embodiment, the route server only builds one RouteList at a time, through the global variable route_rl. This is the primary place where the being-compiled RouteList gets added to the update queue (the others being in the garbage collection phase, below, and in route_rescan( )), so check if the update queue length is greater than the route server_UPDATEQ_MAX (default is 500). If so, throttle the route table thread 412 for the route server_UPDATEQ_THROTTLE microseconds, by default 999999, or just under 1 second. As is noted in the code, throttling the route table thread 412 is a dangerous but necessary thing to do—if problems appear in the future, consider reducing the throttle time, or increasing the maximum length of the update queue.

4. Scan the Peer Table

One of the important jobs of route_thread( ) is to scan the table of peers and update everything which needs updating—this captures all of the various periodic checks on peers that are necessary to maintain correct BGP state. The loop itself is a simple for(;;) loop over the entire peer table, checking each peer in turn for the following conditions:

1. If the peer is established, and configured with a hold time >0, check if it's time to send a keepalive, and also check that the peer's hold time hasn't expired. If it's time for a keepalive, call bgp_send_keepalive( ) for the current peer. If the peer's hold time has expired, call bgp_send_notification( ) with a BGP_ERR_HOLDTIMER value for the current peer.
2. Next, check if the peer has timed out during BGP open negotiation. If so, call bgp_send_notification( ) with a BGP_ERR_HOLDTIMER value for the current peer.
3. If the peer is in BGP_IDLE state, is not configured as "passive", and the route server_BGP_CONNECT_WAIT seconds have passed since the last data from the peer, try to connect to the peer by calling bgp_initiate_open( ).
4. If the peer is configured as "fake" then debug and is currently in state BGP_IDLE, bring the peer up.
5. If the peer is in state BGP_STATE_CLEANUP, call route_peer_shutdown( ) on the current peer, set the last_send value to the current time, and call channel_close_start( ) if the peer is associated with a channel.

5. Garbage Collection

Garbage collection is the process of cleaning up unused data structures, and freeing up resources which are no longer in use, and is also used to enact changes that need to be done with the update and show threads stopped. Garbage collection needs to be done periodically, but the interval at which it is done is not critical—"every few minutes" is fine. The compile-time constant the route server_GARBAGE_COLLECTION_TIME controls how often Garbage collection occurs—the default is every 300 seconds. Since garbage collection involves removing things like unused peers, views, and path attributes, it's important that other threads not read important data structures while it's happening. The command_freeze lock controls whether or not certain commands which read these structures are allowed to proceed. Before running garbage collection, the route table thread 412 tries to get an exclusive (read-write) lock on command_freeze. If the lock is successful, it calls route_garbage_collect( ), which does the actual garbage collection. If the lock is unsuccessful, it postpones the garbage collection time by the route server_GC_POSTPONE seconds (10, by default)—since garbage collection isn't time critical, it's OK to wait.

When route_garbage_collect( ) gets underway, the first thing it does is to lock the BGP peer table, then loop through the peers. If a peer is eligible for garbage collection; when one is found, the reference count for the view which the peer had is decremented, the BGP path attributes which came from the peer are freed, and the peer structure is cleared. If a peer has any BGP path attributes with a reference count of 0, those path attributes are freed. Finally, if the peer has a new view, it is installed, and the reference count for the old view is decremented. After the peer loop is complete, any views with a reference count of 0 are freed. Then, the BGP peer table is unlocked, and route_garbage_collect( ) returns.

6. BGP Route Flap Damping, as specified in RFC2439, can be an important method for reducing routing instability on the global Internet. If the damping timer (the route server_DAMPENING_TIMER—default is 30 seconds) has expired, the function route_dampening( ) is called. The first thing route_dampening( ) does is to lock the BGP peer table, then it scans the route table, looking at every BGPannc structure associated with each route, checking if there is a penalty associated with the announcement. If so, it reduces the penalty if the appropriate half-life time has passed. If the penalty is below the reuse threshold, and the announcement was previously damped, undamp the announcement. After the route table 418 scan is complete, it resets the damping timers on those peers for which it is appropriate.

End of route_thread( ) loop

Once the end of the loop in route_thread( ) is reached, it checks to see if there are any packets in the read queue, or commands in the command queue. If not, the thread waits on the route_cond condition variable, which other threads use to signal the route table thread 412 that there is work to do. If either queue is not empty, the thread loops back immediately.

Update Thread

The BGP update thread 414 is responsible for deciding which prefixes (i.e. routes) need to be advertised or withdrawn to each BGP peer. The update thread 414 receives update structures from the route-table thread and then make a decision for each established BGP peer. The update thread 414 keeps a copy of each peers view, and merely issues routing updates for actual changes in the view.

In an embodiment, the update_thread( ) function itself is very simple—in a loop, the update thread 414 takes RouteLists off the update queue, and sends them to the primary function which runs under the update thread 414, update_process_peer( ). The RouteLists are handled slightly differently depending on whether they're for a specific peer, or for all peers—if it's for all peers, then the RouteList is sent to update_process_peer( ) for each established BGP peer in the table.

The function update_process_peer( ) is one of the larger functions in the route server 405. For performance reasons, it builds its own BGP packets, rather than relying on the functions in bgp.c to do it.

The RouteList passed to update_process_peer( ) should have nothing but RLIST_ROUTE and RLIST_ATTR entries in it, representing the prefixes we're interested in, and the BGPattrs associated with them. Since update_process_peer( ) is called for a specific BGP peer, we're deciding whether or not to send updates or withdraws to that specific peer. For each prefix in the RouteList, the function chooses the best attribute—if no attribute is chosen, then this route will be withdrawn if it had previously been sent to the peer. If the attribute chosen is the same as the one previously announced to the peer, nothing is done. Once the attribute is chosen (or not), the BGP packet is built—multiple updates or withdraws are combined into a single packet when possible, so be aware of that when reading the code. When a packet is full (or an update packet with different attributes needs to be generated), the packet is placed into the write queue of the appropriate channel, and a new packet is started.

Route Table Print Thread(s)

The route table print threads are instances of "command threads" from the diagram above. Unlike the other threads in the route server 405, command threads are short-lived; they are created when needed, perform their task, then exit. The route table print threads have one function: to asynchronously deliver large quantities of information to the user. The thread spawned for this task can throttle the command output so as to avoid generating an unlimited write queue for the channel.

Configuration/Command Thread

Occasionally, a new thread will be created for commands that produce large amounts of output (example: show ip bgp). The spawned thread will take care not to buffer too much output (flow control).

In an embodiment, a persistent thread coded to handle simple network management protocol (SNMP) issue forms part of the daemon. SNMP is used by network management systems to monitor network-attached devices for conditions that warrant administrative attention. SNMP consists of a set of standards for network management, including an Application Layer protocol, a database schema, and a set of data objects. SNMP exposes management data in the form of variables on the managed systems, which describe the system configuration.

Locking

Throughout the route server 405, critical pieces of data structures are protected by pthread locking primitives—the two basic lock types are pthread_mutex_t and pthread_rwlock_t. The primary difference between a mutex (a mutual exclusion lock) and a rwlock (read-write lock) is that a mutex allows only one thread to hold it at a time, whereas a rwlock allows multiple threads to hold read locks, but only one thread to hold a write lock. (A write lock can only be held if no other threads have read or write locks). This allows, for example, many readers of a given resource, but only a single writer. the route server 405 takes great advantage of read-write locks to protect the BGP peer table, the channel table, and garbage collection, and uses mutual exclusion locks to protect queues. Note that the route table 418 itself is not protected by locks—rather, the route server 405 itself is designed so that only the route table thread 412 writes to the route table 418, and that reading the route table 418 is always safe. (Partly because routes are never de-allocated—if this ever changes, locking may need to be added, at a performance penalty) More importantly, announcements are not de-allocated until garbage collection, which means that the update thread 414 can continue to read them even if they are in the process of being deprecated.

Route Table

Figure 5:
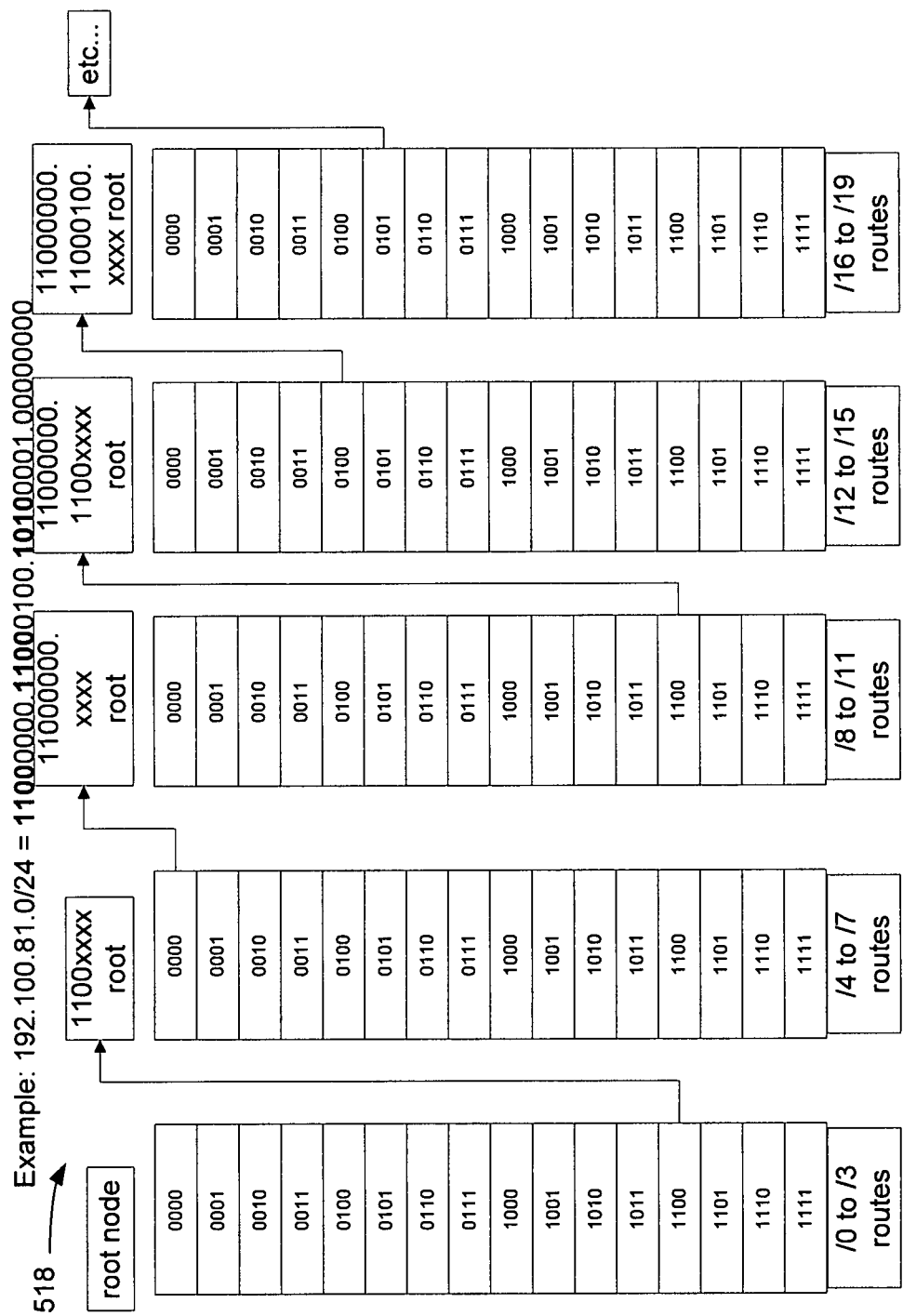
FIG. 5 illustrates a diagram of an embodiment of a route table.

FIG. 5 illustrates a diagram of an embodiment of a route table. The route server may have several internal data structures. The primary data structure is the route table 518, which is a hybrid combination of a linked list and B-tree. The configuration of the route table 518 has a bounded maximum depth, such as six roots, to allow non-recursive searching and inserts for maximum performance. Virtually all of the data handling done by the route server consists of passing around read-only pointers into the route table 518. This allows a single persistent thread, the route table 518 thread, to perform all writing to the table, while still allowing other threads to read from the route table 518. Thus, the route table 518 allows multiple threads to read the information stored there, while only the route thread is allowed to write to the route table 518.

The construction of the route table 518 is such that each root of the tree handles routes of specific netmask lengths. Routes are located in the route table 518 initially by specific prefix length to single down the root being scanned for the route data. The construction of the route table 518 also has pre-allocated memory space for all possible prefixes in the routing table. Thus, the route table 518 has a pre-balanced organization, by net mask length for each root, and then a field entry for every possible prefix within that root of net mask lengths to make sure that the route table 518 never needs to be rebalanced during run time. Plus, every announced route is kept permanently in the pre-allocated memory space of the route table 518 to enable no reason to add or delete existing routes in the route table 518 when a new BGP session is established; rather, just change some attributes associated with a given prefix by updating of some pointers. Thus, a route in the route table 518 is not deleted once entered into the route table 518 even if that route is no longer being announced. The route server need not relearn every route each time a new BGP session is established but merely, in most cases, update some pointers.

When a route is received, the route server generally only wants to look the prefix up once. As a result, the route table 518 structure is a hybrid cross between a B-tree and a linked list. At first, the B-tree portion of the route table 518 is used to look up some of the initial bits of the route address to determine a particular root in the tree. Once the correct root is found, a sorted linked list of routes is examined.

The B-tree portion uses a tree data structure that keeps data sorted and allows insertions and deletions in logarithmic amortized time. In the B-tree, the roots can have some pre-defined range of specific netmask length.

Route table 518 lookup is the single action performed most in the route server so route table 518 lookup is optimized as much as possible. Each root of the tree handles routes of specific netmask lengths: the top root handles masks of /0 to /4, the second root /5 to /8, third root /9 to /12, fourth root /13 to /16, fifth root /17 to /20, and sixth root /21 and longer. The decision was made to include all prefixes longer than /24 at the sixth root since operationally, very few routes of that length are encountered in the public internet. If the route server is ever put in an environment where longer prefix routes are common, this structure can be adjusted. Note also that the top-root node handles /0 to /4, instead of /0 to /3 that the normal four bits would imply. This was done because "/0" is really just a shorthand for the default route. This increases the possible number of routes at the top root from 16 to 17.

Once the correct root is found, there will be a sorted linked list of routes. Each node in the route table 518 structure contains a linked list of routes. The linked list portion uses a data structure consisting of a sequence of nodes, each containing arbitrary data fields and one or two references ("links") pointing to the next and/or previous nodes. The principal benefit of a linked list over a conventional array is that the order of the linked items may be different to the order that the data items are stored in memory or on disk, allowing the list of items to be traversed in a different order. The linked list is a self-referential data type because it contains a pointer or link to another datum of the same type. The linked lists generally permit insertion and removal of nodes at any point in the list in constant time.

Thus, each particular prefix (or route), such as 192.168.25.0/24, only has one structure route associated with it in the table, no matter how many peers are originating or receiving the prefix. Walking the tree of the route table 518 in this fashion takes a shorter amount of time because every entry in the route table 518 need not be scanned merely the prefix entries in a given root with the range of netmask lengths that the prefix being checked would be found in. This organization of the route table 518 eliminates a full scan of the route table 518 each time route information needs to be looked up.

In an embodiment, each node may have 16 entries for the next root of the tree. To avoid sixteen compares and to force somewhat of a balance in the tree, those sixteen entries represent 4 bits of the network address. Each root will contain routes with netmasks within 4 bits of each other. So the first node will contains all of the routes that are /4 or less (should be none on the internet). That node will have 16 pointers to the next layer which will contain routes with /5, /6, /7 and /8 netmasks. This is done with a shift and "AND" operation to generate the index for the next node. Only the netmask needs to be compared at this point (another AND operation).

Usually the linked list will be small (1-6 entries). The maximum depth of the tree is 6 (/21-/24) because recursion can have a negative impact on performance, due to function calls. Any routes that are greater than /24 will be included at this depth because they should be non-existent and will not add much to the linked list length. Having a maximum depth allows the route server to do an unrolled search verses a recursive procedure call.

Thus, the array of structure tree node pointers each points to a node that represents four bits of the network number. An example prefix with a base-10 address of 192.100.81.0/24 is converted to an address of 11000000.11000100.10100001.00000000 and looked up in the route table 518. The search/insert algorithm works as follows in the function tree_find( ): if the mask of the route being looked up/inserted matches the top root, then the route is (or should be) in the sorted linked list of routes at the current root. Otherwise, take the first four bits of the network address and check the next pointer that corresponds to these bits. Follow the pointer to the next-root node (creating it if it does not exist). If the mask matches the current root, then the route is in this node's linked list; otherwise take the second four bits of the network address, and follow the corresponding next pointer, and so on until you reach the appropriate root for the mask length of the current prefix.

Each node in the tree may be implemented using the following structure:

```
struct treenode {
    struct treenode *next [16];
    struct route *route;    /* sorted linked list of routes */
};
;
```

In an embodiment, each node can have only a fixed maximum 16 routes for speed enhancement of the unrolled search. In an embodiment, instead of the linked list, the route server could use an array of 16 pointers. The array occupies more memory of course, but prevents the need for all of the linked list scans. The max depth for the array would then become 8.

When a prefix that is already in the table comes into the route server, no new route structure is allocated, and a new BGP attribute is only allocated if the BGP attributes of this prefix (such as the AS-path) are not the same as any other prefix announced by this peer. Thus, when the new prefix is received a route structure is allocated. There is only one route structure per prefix, and once allocated is not de-allocated. In an embodiment, the route server may add de-allocation of the route structure during the garbage collection process. However, most times the route structure is not de-allocated because if a prefix gets withdrawn, there is a very good chance the prefix will be re-announced relatively quickly.

Thus, a prefix, once allocated in the memory, is never freed which makes the route server extremely fast and efficient. By never freeing route objects in memory, the route server avoids expensive blocking free( ) kernel calls, and provides a mechanism for a Route Withdrawal operation (critical to resetting a BGP session) to be performed completely non-blocking. Also, by not freeing route objects, when a new route is announced, the route server does not have to write it to memory, the route server only has to update new pointers to the route that already existed in memory. This saves expensive memory write cycles. Since Route Withdrawals and learning new Routes is a very common function during Route Flap, the route server has optimized its system to be immune to the impact of daily network hiccups that cause expensive BGP computations in other implementations.

```
struct route {
    struct route *next;
    uint32_t network, netlen, netmask;
    BGPattr const *peerview [the route server_MAX_BGPPEERS];
    uint32_t annc_num, annc_max;
    BGPannc *announcements;
};
```

The peerview array is a pointer to the current attribute that is being announced to a peer. Adjusting the config.h variable the route server_MAX_BGPPEERS may have a large effect on memory consumption. This was implemented as a static array to avoid calling malloc( ) or realloc( ) every time the number of active peers changed. It is also not dynamic, because every peer needs a peerview decision. Announcements on the other hand are dynamically allocated, because each individual prefix will not be announced by that many peers. Incoming announcements are stored in the following structure:

```
typedef struct BGPannc_t {
    BGPattr *attr;
    uint16_t peerid;
    uint16_t penalty; /* dampening penalty */
} BGPannc;
```

Also, note that an BGPannc structure is kept around after a withdrawal if it still has a dampening penalty assigned to it. Penalties have to be remembered until they reach zero. These structures get cleaned up occasionally during periodic garbage collection.

Scanning the Route Table

Even though the route table 518 is a tree, it can be scanned using a non-recursive algorithm because the route table 518 has a known maximum depth such as six roots. When the route table 518 needs to be scanned to create RouteLists for sending to other threads, a non-recursive algorithm is used because the tree has a known maximum depth, and non-recursive scanning eliminates the extra function-call overhead which would be required by a recursive algorithm. The scanning algorithm will be implemented using #define macros so that we can inline the scan in all of the necessary places for speed. Those functions which need to walk the route table 518 implement it using the various TREEWALK macros:

TREEWALK_LOCALS defines the local variables a function needs, TREEWALK is the struct route * which is walked, TREEWALK_LOOP_START sets up the loop, and TREEWALK_LOOP_END terminates it. A minimal function of inline code walking the tree is set up like so:

```
void proc (...) {
    TREEWALK_LOCALS;
    TREEWALK_LOOP_START {
        printf ("route is %08x\n", TREEWALK->network);
    } TREEWALK_LOOP_END
};
```

Basically, TREEWALK_LOCALS defines some variables needed to scan the tree, TREEWALK_LOOP_START and TREEWALK_LOOPEND are the main portions of the algorithm. Any code can go in the middle of the loop, and TREEWALK points to a struct route entry.

Route Table Management

The route table 518 is being constantly updated and the route server shares the regularly updated route table 518 with all of the threads. When information needs to be shared, threads other than the route thread can read from the route table 518 via route lists passed from the route thread. The route and its announcements are placed into a route list and communicated to one of the other persistent threads, then that other persistent thread is allowed to read any of the pointers placed into a route list knowing that they will still exist, and the communicated route lists prevents the other threads from needing to scan the route table 518 itself, which may be changing and could send a thread off into unallocated space.

The tradeoff is that the route thread occasionally has to wait for the other threads to stop reading the table, so it can clean up structures that have become obsolete. If the other threads are currently busy, the route thread will put off garbage collection and try again in a little bit.

```
#define ROUTE_LIST_MAX       13100
typedef struct route_list {
    int peerid; /* specific peer, or −1 = all peers */
    int num; /* number of entries in this table */
    uint8_t type [ROUTE_LIST_MAX];
    void *ptr [ROUTE_LIST_MAX];
} RouteList;
```

The route thread fills up as many route-lists as it needs and passes them to whatever thread needs the data. Usually this will be the update thread, but commands like "show ip bgp" may need a list of routes to print. Peerid is used to tell the update thread which peer this update applies to. −1 indicates all peers should be scanned. Use of a specific peer is generally for when a peer is established and needs routes sent to it, or when a peers access list changes.

Struct Route

The primary items manipulated by the route server are routes. Each node in the route table 518 structure contains a linked list of routes, which are of type struct route:

```
struct route {
    struct route *next;
    uint32_t network, netlen, netmask;
```

```
    BGPattr const *peerview [the route server_MAX_BGPPEERS];
    uint32_t annc_num, annc_max;
    BGPannc *announcements;
};
```

This structure helps to abstract many of the important concepts of the route server—each particular prefix (or route), such as 192.168.25.0/24, only has one struct route associated with it in the table, no matter how many peers are originating or receiving the prefix. The auxiliary details—which peers the route has been heard from, which peers the route should be announced to, and the BGP path attributes associated with the announcements, are covered by the other fields of struct route.

Uint32_t network, netlen, netmask;

Three 32-bit quantities provide the basic information about the prefix in question—what is its network address? In this case, since our network is "192.168.25.0", the network field would contain the 32-bit equivalent, 0xc0a81900. The netlen and netmask fields contain the same information, in different formats—the mask of the network in question which tells how many bits are relevant. In this case, netlen is 24 (from the /24), which corresponds to a netmask of 0xffffff00. The reason this information is stored in two different forms is to save having to convert it back and forth constantly—the conversion is done once, at input time, and from then on whichever version is needed can be used without further conversion. An embodiment of the route server uses a 32-bit equivalent rather then a smaller type (an 8-bit or 16-bit type) because the route server is optimized for a processor model which does 32-bit data loads. An embodiment of the route server may not be optimized for expected traffic and thus have a smaller field in the middle of struct route. This would cause the other fields to no longer be aligned at 32-bit boundaries, which would cause performance to drop dramatically for most 32-bit processors. thus, an embodiment of the route server is optimized for expected traffic.

BGPattr const *peerview [the route server_MAX_BGPPEERS];

Each peer can announce a given prefix to the route server with different BGP path attributes. Peerview is a pointer to the current attribute we have sent to each peer: a per-peer pointer to a BGPattr structure. The BGPattr structure looks like this:

```
typedef struct BGPattr_t {
    uint32_t refcount;
    the route server_CLASS_TYPE class;
    uint32_t peerid;
    uint32_t next_hop;
    uint32_t med;
    uint32_t cost;
    uint16_t loss, rtt;
    uint16_t jitter, weight;
    uint32_t attr_len;
    uint16_t as_ptr, as_segments, as_len,
    community_ptr, community_num;
    uint8_t origin;
    uint8_t not_missing; /* flags */
    u_char packet [4]; /* note: open ended array, using malloc */
} BGPattr;
```

The BGPattr structure is designed to capture the path attribute information from a BGP update message in a format that is both easy to use within the route server to perform comparisons on relevant information, but also to store those attributes in the form in which they were originally received by the route server.

Uint32_t annc_num, annc_max;
    annc_num is the number of BGPannc structures in the announcements field, below. annc_max is the maximum number of BGPannc structures that will fit in the currently-allocated space for announcements.
BGPannc *announcements;
    The announcements field is a pointer to a block of BGPannc structures that has been dynamically allocated using malloc( ). To limit the number of malloc( ) operations, when more space is needed for announcements, the route server_MALLOC_ANNC (by default 4) structures are allocated at a time. If more space is needed, realloc( ) is called to increase the amount of storage available. Currently, the route server never reclaims memory allocated for BGPannc structures, because of the performance impact excessive memory copying would cause, and the assumption that the maximum number of announcements of a prefix would tend to remain the same or increase over time, not decrease. Any garbage-collection process for announcements in the future would need to carefully consider potential performance impacts.
    The BGPannc structure looks like this:

```
typedef struct BGPannc_t {
  BGPattr *attr;
  uint16_t peerid;
  uint16_t penalty; /* dampening penalty */
} BGPannc;
```

Basically, it associates a BGP peer and a damping penalty with a BGPattr. This allows us to track specifics about an instance of a route: which peers has the route server heard the announcement from, and what attributes does it have in that instance.
RouteList
    Threads other than the route thread can read from the table via RouteLists passed from the route thread. Limiting writes to a single thread makes table management very straightforward—via read locks, multiple threads can read from the table simultaneously, and since the route thread is the only one obtaining a write lock, there are few synchronization issues.
    The RouteList is a structure that holds read-only pointers into the route table 518, for the route thread to pass information about routes (and views) to other threads which may need to know about them. The basic structure of a RouteList is that of an array (the payload member):

```
typedef struct route_list {
  int peerid; /* specific peer, or -1 = all peers */
  int num; /* number of entries in this table */
  uint8_t type [ROUTE_LIST_MAX];
  union {
    void *ptr;
    BGPattr *attr;
    struct {
      uint16_t peerid;
      uint16_t penalty;
    } peer;
  } payload [ROUTE_LIST_MAX];
} RouteList;
```

Figure 6:
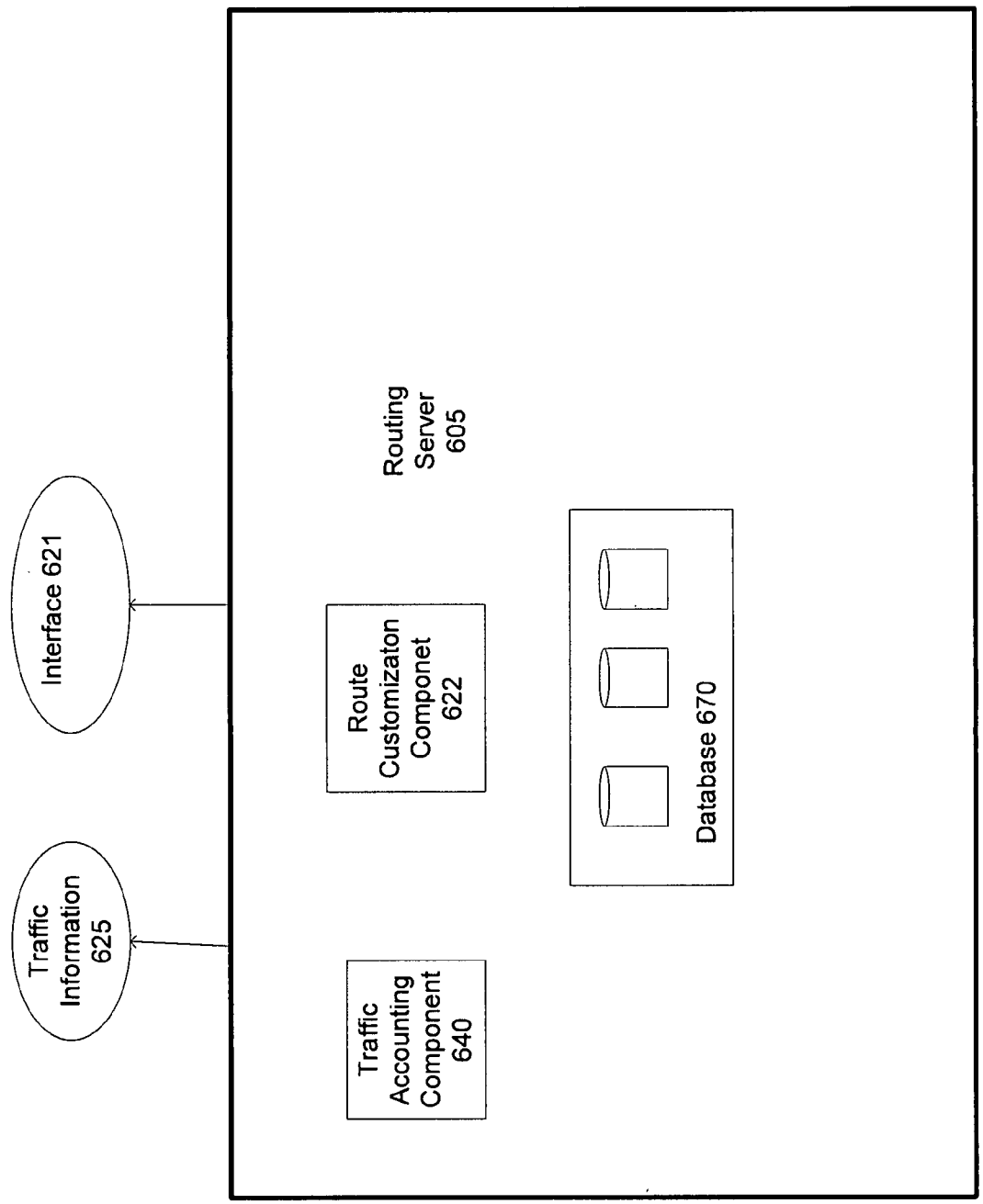
FIG. 6 illustrates a block diagram of an embodiment of a traffic accounting and route customization portion of the route server.

In an embodiment, the array is always the same size. ROUTE_LIST_MAX. The default value for ROUTE_LIST_MAX is 13100, because that allows a RouteList to fit within 65536 bytes (64 k) when 32-bit pointers are used—it's a big enough chunk that we're not allocating memory too often, and small enough that we're not wasting a lot of space when our RouteList has only one or two entries. The array is always the same size, but the field num specifies how many active entries there are in the list at a given time—like other data structures in the route server, a RouteList can be allocated or recycled, but is never destroyed. Because a RouteList is a persistent entity, it pays to make it as flexible as possible—at its heart is a union, which allows it to store a void *, a BGPattr *, or a structure consisting of two 16-bit integers.
    A RouteList can store each of the following in each payload slot:
        a pointer to a struct route (RLIST_ROUTE);
        a pointer to a BGPattr (RLIST_ATTR);
        a pointer to another RouteList (RLIST_NEXT); and
        part of a BGPannc structure (RLIST_ANNC or RLIST_ANNC2).
    The cases where the payload is a pointer are relatively straightforward—the type field merely indicates what type of data is being pointed to. The RLIST_ANNC and RLIST_ANNC2 cases are somewhat different—the payload then contains a copy of the actual structure, not a pointer to it. Since the BGPannc structure is larger than a single pointer, it is kept in two successive RouteList slots. The reason for copying the BGPannc rather than passing a pointer is that the data being pointed to can sometimes be freed before the thread which the RouteList was passed to reads the data. This could be a bug if the command thread spawned to handle output of long-running commands, such as show ip bgp, and crash the route server.
    The route server may have a large capacity of prefix allocations in its route table 518 due to the structure of the route table 518 as well as memory alignment with the route server. The route server routes traffic requests in real-time/fractions-of-a-second using such voluminous routing tables containing a hundred thousand or more possible routes.
    FIG. 6 illustrates a block diagram of an embodiment of a traffic accounting and route customization portion of the route server. The route server 605 has code programmed to present a user interface 621 to the user to gather the user criteria and match the user criteria to information provided by the ISPs to automatically provision ISP services to each user based on criteria provided by both the that user and the ISP providers. The route server 605 automatically provisions ISP services to users based on this criteria without a long-term traffic or contract commitments. The route server 605 connects directly to the network elements of the plurality of users, in order to route Internet packets using Border Gateway Protocol, and to automatically select the Internet network service providers. A database 670 stores a plurality of user criteria regarding Internet network service in change requests provided by each of the users and stores network service information from the plurality of Internet network service providers. The route server 605 automatically re-routes the network services including the Internet packets from one or more of users based on both a change request being provided by one of the plurality of Internet network service providers and based on users' criteria provided by a change requests provided by the user and stored in the database.
    The route server 605 has the user interface 621 that allows the users to generate the change request with the user interface 621. The change request can include network service criteria describing the network services to be provided by the selected network service provider routers. The network service criteria describes the network service provider routers to reject. The database also stores media access control addresses of each network element on the network with a specific user and stores media access control addresses of the network elements from the plurality of Internet network service provider for the route customization server to select the Internet network service providers to automatically re-route the network services to, including the Internet packets, from at least one of the plurality of users.

The plurality of network service provider routers can provide pricing information, bandwidth, route times, etc. of their network services to the route server 605 via the user interface 621. The route server 605 selects the peering of one of the plurality of users to one or more of the Internet network service providers based on the supplied network information. When a user makes a route customization change, then a function such as a portalRouteConfig re-generates the configuration and sends it to the route server 605.

The basic configuration is governed by a configuration template, which is stored in the database on a per-IBX basis. The template consists of a mix of commands and special portalRouteConfig commands to generate the peering mesh.

The traffic accounting server 640 may provide billing information to the plurality of users based on the network services to be provided by the selected internet network service provider routers. The billing information is based on one or more media access control (MAC) addresses being used by the network elements associated with that user. The billing information being based on the amount of network traffic each of the selected network service provider routers carries. The network traffic includes a plurality of data packets having a timestamp and at least one of the MAC addresses. The traffic accounting server 640 may determine an aggregate network usage of each user based on the MAC address and to calculate billing information for each user based on the aggregate network usage. The traffic accounting server 640 has an input to receive network traffic information on a periodic basis and to calculating an aggregate network usage based on a ninety-fifth percentile algorithm. The traffic accounting server 640 may provide the billing information to each user in an electronic billing statement.

Figure 7:
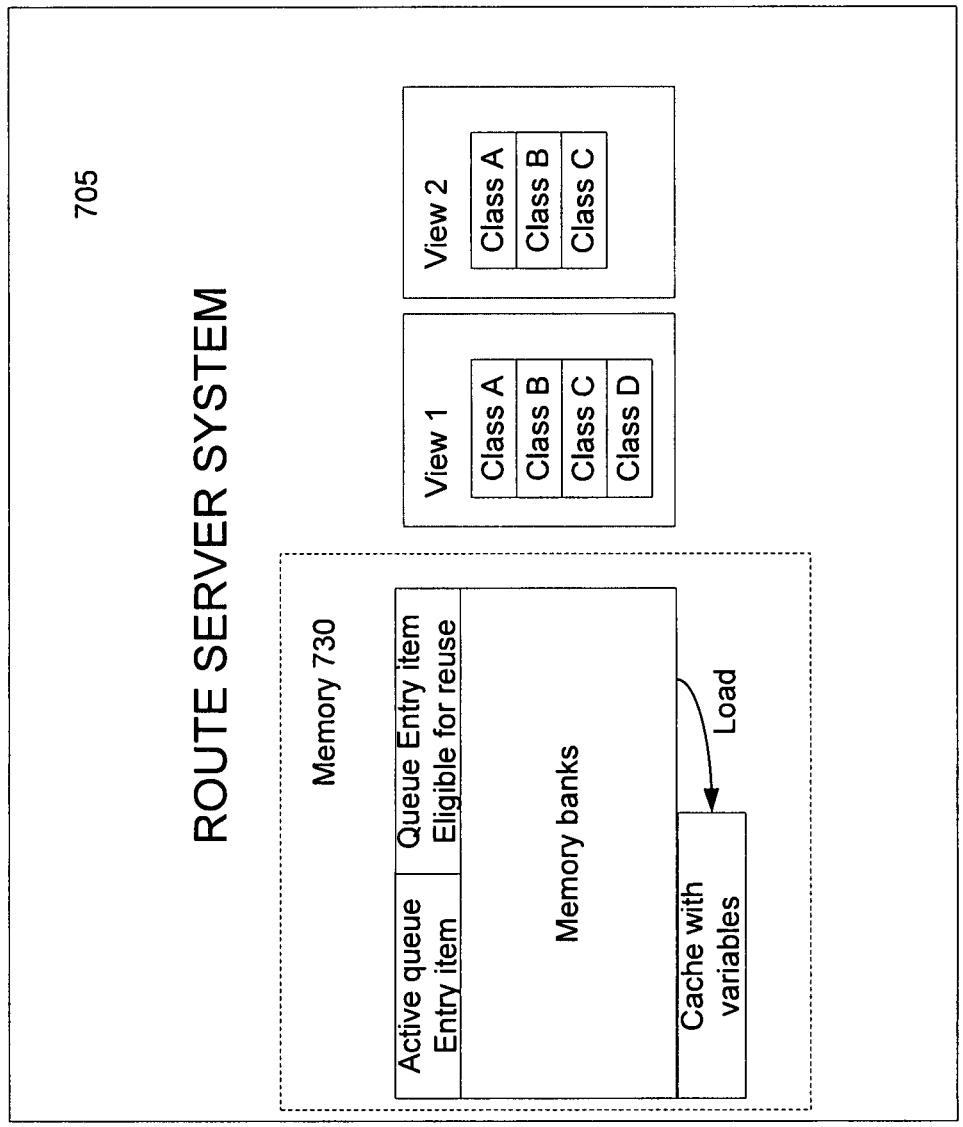
FIG. 7 illustrates a diagram of the route server using its memory and views.

FIG. 7 illustrates a diagram of the route server using its memory. The route server 705 directs traffic requests in real-time/fractions-of-a-second using voluminous routing tables containing potentially a full set of all available prefixes/routes. The route server 705 directs the traffic requests rapidly due in part to a large capacity of prefix allocations in its route table and memory 730 alignment. The route server 705 also benefits from recycling queues, making better use of cache loads by keeping sequentially used global variables near each other in memory 730 in a single file, never freeing a prefix from the memory 730 once allocated in the memory 730, and other efficiency improvements.

Queues Recycled

The queue implementation used by the route server 705 is fairly straightforward; apart from thread locking and maintaining a pool of queue entries to reduce the amount of malloc( )/free( ) activity, it's basically just two linked lists: active Queue Entry items, and a list of Queue Entry items which are eligible for reuse.

The route server 705 uses one or more queue structures that will be setup with built-in thread locking and signaling. The example structure looks like:

```
typedef struct QueueEntry {
    struct QueueEntry *next;
    void *dataptr;
} QueueEntry;
typedef struct Queue {
```

-continued

```
    QueueEntry *first, *last, *reuse;
    u_int count; /* how many entries are in the queue */
    u_int initcount; /* how many entries to init during malloc */
    pthread_mutex_t lock;
    pthread_cond_t cond;
} Queue;
Queue *queue_new (u_int initcount);
u_int queue_size (Queue *q);
void queue_add (Queue *q, void *dataptr);
void *queue_get (Queue *q, int wait);
void *queue_get_locked (Queue *q);
#define QUEUE_WAIT      1
#define QUEUE_NOWAIT    0
```

The "initcount" parameter tells the queue commands to allocate that many Queue Entry structures at a time using 1 malloc statement. Thus, when a Queue is initially set up (by a call to queue_new( )), the initcount parameter is set to the number of Queue Entry structures to malloc( ) each time the queue needs to grow.

Ideally, the route server 705 wants to move as little data around as possible. Most of the data flow should be done with pointer moves. Packets and structures inside the system will not be freed, but be placed in a recycle pile. This will save lots of calls to malloc( )/free( ), which must acquire a lock to avoid thread issues. The route server 705 takes advantage of this fact to limit the amount of malloc( ) activity.

All of the new entries are added to the "reuse" list. The pool of queue entries in the "reuse" list is use to recycle the Queue Entry structures so the route server 705 does not have to constantly malloc( ) and free( ) them (malloc and free cause thread locking). Thus, when a Queue Entry is processed, it is added to the queue's reuse list rather than being free( )ed—since malloc( ) and free( ) cause thread locking, the route server 705 want to minimize the amount which occurs. The malloc uses dynamic memory allocation in which memory 730 is more explicitly but more flexibly managed, typically by allocating it from a heap, an area of memory 730 structured for this purpose. In C, one uses the library function malloc to allocate a block of memory on the heap. The program accesses this block of memory via a pointer which malloc returns. When the memory is no longer needed, the pointer is passed to free which de-allocates the memory so that it can be used for other purposes. Thus, queues are also used to hold "empty" Queue Entry structures for reuse—in the current scheme, they're never freed, since they will more than likely be needed again. "queue_get" takes a wait parameter QUEUE_WAIT, or QUEUE_NOWAIT. If wait is selected, the queue will wait for a signal from queue_add.

One thing to be wary of—since the Queue Entry structs are never freed, if a queue ever grows very large because of a one-time event, that memory will not be potentially reclaimed until the route server 705 is restarted. In practice, however, this should not be a problem.

The route server 705 may also use a realloc to grow or shrink a block of memory. The realloc returns a pointer to a memory region of the specified size, which contains the same data as the old region pointed to by the pointer (truncated to the minimum of the old and new sizes).

Any memory pointers enqueued are the responsibility of the calling routine to allocate and/or free. Thus, the routines that use queues are responsible for allocating and freeing any memory pointers passed into this queue. Usually, after data is removed from these queues, the calling thread will put the data pointer into its own recycle queue for later use. For example, the read thread puts packets into the read queue. The update thread processes the packet and puts the used packet into the read_recycle queue. The read queue uses the read_recycle queue. This avoids a large amount of memory allocation and de-allocation, and allows us to allocate structures in large contiguous chunks.

In the route server 705, queues are used as the primary method of communicating things between threads—the actual content of the data pointer depends on which queue. For example, the read thread places BGP packets it receives from peers on the read queue (to be processed by the route table thread). The update thread places BGP update packets on the write queue of a particular peer's channel, to be sent to that peer by the write thread.

Memory Usage

The route server 705 keeps sequentially used variables near each other in memory 730 for Memory Speed and efficiency. All of the global variables in the route server 705 may be collected in a single file, such as a vars.c file. Keeping the most frequently-access variables like this together helps keep them in cache, which is an important performance consideration. Most of the variables are things you would expect; arrays of the channels and BGP peers available to the route server 705, an N×N array of import masks, pointers to important queues, a pointer to the active config, pointer to the route table, and various locks and global counters. There's also a global temporary storage area for route updates to help avoid lots of memcpy( ) during live updates. The route server 705 makes better use of the cache loads by keeping sequentially used variables near each other in memory 730.

The route server 705 has a few compile time knobs that control the maximum number of peers. By doing this, the route server 705 pre-allocates certain areas of memory 730, and saves a large amount of memory bandwidth that would otherwise be used on scanning dynamically sized data. Control the maximum number of peers also lets me put similar data near each other in memory 730 for caching efficiency.

In an embodiment, cache loads may also be optimized. The route server 705 uses a 32 bit memory model because the data moving across the memory bus will be pointer scans and copies. The processor may move data from memory to the external cache 64 bytes at a time, and can take 6 clock cycles to load a cache line. It takes two clock cycles to move 8 bytes from the external cache into the internal cache. Internal cache can run at processor speed. If the route server 705 use 64 bit pointers, the route server 705 will increase I-cache to E-cache to external memory transfers by a minimum of two. More system overhead exists in dealing with twice as many memory pages to cause the 64 bit mode to run slower than the 32 bit mode.

Also, the instruction size may still have 32 bits in 64 bit mode, which means that literals are still limited to 16 bits in many places. To load a pointer or other 32 bit constant value takes 2 instructions (loadhi the first 16 bits, and or the second 16 bits). In 64 bit mode, it takes six instructions (two loadhi's, one sllx (shift left), and three or's). It will issue addx type instructions, but do the data loads at 32 bits. The route server 705 allocates data by making everything accessed 32 bit aligned.

Input-output communicating may be done via a Channel. Basically, the Channel is a socket plus some additional bits: such as a socketid, which Is the socket descriptor for the channel; and peerid, which is the peer with which the channel is associated. This includes daemon channels (they listen for BGP and admin connections), log channels (files, syslog, stderr), BGP peers, and administration logins. Channels are statically allocated at compile time, and controlled by the config.h define the route server 705_MAX_CHANNELS.

This is done this way to keep all the commonly used data in the same area of memory to try and benefit from caching as much as possible. The route server 705 saves cache space and memory bandwidth by setting this close to the route server 705_MAX_BGPPEERS, plus leaving room for log files, daemons and logins.

BGP peers are also kept in a statically allocated array for the same reasons. BGP peer structures are populated for every configured peer, even if it is configured for shutdown. Peers may show up in state "deconfig" for a while if they are removed. Final removal of the peer happens during garbage collection.

Note that incoming BGP attributes are stored in a sorted dynamic array. Very often similar routes from the same peer will share the same attribute. The route server 705 benefits greatly by sharing the attribute between the prefixes. Unused attributes are eventually removed during the garbage collection process.

Referring to FIG. 5, the route server strives to be as efficient with its use of memory as possible by assuming the type of use the route server will see. Since the route server was designed as a route server for use with Internet routing tables, it is expected that the route server should see a typical set of prefixes from its peers. Transit ISP providers should be sending a full set of prefixes, which may be around 129,000 unique prefixes. A prefix may be a code string that specifies both start and end addresses and a length of a given route. The route server _MAX_BGPPEERS can be set to the default of 100, and 32-bit pointers so each unique prefix takes a minimum of 428 bytes of memory. (Note, the size of struct route, which depends on the route server _MAX_BGPPEERS). However, since most default-free hosts on the internet have very similar sets of prefixes, ten peers sending 129,000 prefixes each may only have 129,500 unique prefixes among them. When a prefix that is already in the route table 518 comes into the route server, no new struct route is allocated, and a new BGPattr is only allocated if the attributes of this prefix (such as the AS-path) are not the same as any other prefix announced by this peer. The BGPannc structure is allocated in chunks of the route server _MALLOC_ANNC and attached to the struct route for a given prefix—there are always at least enough of these chunks to cover each live announcement. Thus, a prefix, once allocated in the memory, is never freed which makes the route server extremely fast and efficient.

So, this is potentially a lot of memory to allocate—but given the expected workload (lots of prefixes with lots of announcers, but most announcers announcing a similar set of prefixes), it is fairly safe to assume that once a prefix has been announced, it will probably be around "forever." Even if the current announcer withdraws it, somebody else will probably announce it. The route server takes advantage of this fact to limit the amount of malloc( ) activity—a prefix, once allocated, is never freed. This helps the route server avoid a lot of memory thrashing, but at a price—if a peer does something wrong, like inadvertently send lots of longer-prefix subnets of a normally much shorter prefix (de-aggregation)—it could cause the route server to allocate large chunk of memory that will never be freed until the route server is restarted.

FIG. 7 also illustrates a diagram of the route server maintaining multiple views with multiple classes. The route server 705 maintains a view of a group of peers in an autonomous system whose routes are considered together. Each view has also a plurality of classes associated with that view where each of the routes considered together is in zero or more of the plurality of classes and the routes considered together are assigned to classes based on networking attribute criteria.

Thus, the view is roughly analogous to a router—that is, each view consists of a group of peers, usually in the same autonomous system, whose routes should be considered together, and who should be sent the same set of routes from other views.

The route server 705 also supports classification of routes at input time with the views and classes. Each view defines the number of classes in that view and a route can belong to one or more of the classes. The classes may be used for differing classes of service, which a given ISP provider offers. For example, IP Transit may be one class, and on-net may be another. Also, merely a set of routes in a given class may be imported into another peer's view.

Because of performance considerations, the route server 705 may not have quite as fine-grained control over filtering and altering routes as some routers. The primary means of filtering is route classification, which is performed when routes are received from peers. Using the four main matching types (prefix-map, aspath-map, community-map, and nexthop-map), routes are added to various classes on import. Each view can have up to 32 classes, and each route can be in zero or more classes. A route, which is in no classes, is never passed on to any peers. Routes are included for consideration by other views based on which class they are in, using the import statement. The classes may define/include routes such as backup routes in a first class, US only routes in another class, Europe only routes in a third class, rates charges for route in a fourth class, etc.

Referring to FIG. 2 and the code snippet below, buyer-1 is buying from both isp-1 and isp-2, while buyer-2 is only buying from isp-2. The buyer-1 view will get to choose from routes in the isp-1 "on-net" class, and the isp-2 "transit" class, while the buyer-2 view will get those routes in isp-2's "on-net" and "Europe-only" classes. Note that this code snippet does NOT show any of the actual classification bits.

```
view name isp-1
  two classes
  class transit
    class on-net
    member in view structure points to import buyer-1 class buyer-1
view isp-2
  class transit
  class on-net
  class Europe-only
  import buyer-1 class buyer-1
  import buyer-2 class buyer-2
view buyer-1
  class buyer-1
  import isp-1 class on-net
  import isp-2 class transit
view buyer-2
  class buyer-2
  import isp-2 class on-net Europe-only
```

Note that there is no export command; the act of classifying routes is what tags them for export. The import of a class marks all of the routes associated with that class as valid for sending to the view's peers; Best Path processing then determines which routes will actually be sent except for the subset of ISP providers selected by the user to send full listings of routes.

Views are stored separate from the BGP peering structs, and can be shared by multiple BGP peers. Note the bit packing in the best path variable. The idea here since it is referenced very often is to keep it in a register and in local cache.

The view structure holds all of the information relevant to a view of the routing table. The view structure holds all the pieces of information that can be set on a per-view basis—the best path order information, BGP damping settings, the imports list, class names, the various maps and other similar information. There is also a reference count, so the garbage collector can know when it is safe to delete a view, and the name of the view, which is how it is associated with peers (and consequently with actual routes).

The view structure does not directly contain any information regarding the routes themselves—the class_mesh actually tracks which routes are eligible for inclusion into the views of peers, but the information in class_mesh is generated by view_change( ) from the list of imports. Here is what the view structure actually looks like:

```
typedef struct View_t {
  struct View_t *next;
  /* packed 32bit int as follows:
   * bottom 8 bits: flags (0x000000ff)
   * next 8 bits: unused (0x0000ff00)
   * top 16 bits are best path order..3 bits at a time
   * 1st comparison: 0x00070000 0000 0000 0000 0111
   * 2nd comparison: 0x00380000 0000 0000 0011 1000
   * 3rd comparison: 0x01c00000 0000 0001 1100 0000
   * 4th comparison: 0x0e000000 0000 1110 0000 0000
   * 5th comparison: 0x70000000 0111 0000 0000 0000
   * last bit unused: 0x80000000 1000 0000 0000 0000
   */
  uint32_t best path;
  uint16_t dampening_penalty; /* 0 = no dampening */
  uint16_t dampening_halflife;
  uint16_t dampening_reuse;
  uint16_t dampening_supress;
  uint16_t dampening_maxsupress;
  uint16_t dampening_maxpenalty;
  uint8_t obsolete;
  ViewImport *imports;
  PrefixMap *prefix_map;
  CommunityMap *community_map;
  NexthopMap *nexthop_map;
  ASpathMap *aspath_map;
  int refcount;
  char class_name
    [EDRS_CLASS_BITS][EDRS_NAME_MAX_LEN + 1];
  char name [EDRS_NAME_MAX_LEN + 1];
} View;
```

In an embodiment, each view can assign various classes to its incoming prefixes. There are a maximum of 32 classes per view, because we take each class name and assign it a bit position. This allows us to use a single 32 bit integer to declare what classes a BGP advertisement is in.

Furthermore the list of imports from other views can be stuffed into a 32 bit integer. Since each peer needs a custom import list for each other peer, we end up with a very compact N×N array of 32 bit integers to express every peers wishes. This makes the initial filtering of announcements very fast because the all we have to use is a logical AND. Basically, the algorithm is: announcement->class AND class_mesh [from] [to].

```
/* class mesh: [x][y] x=from y=to */
extern EDRS_CLASS_TYPE class_mesh
  [EDRS_MAX_BGPPEERS][EDRS_MAX_BGPPEERS];
```

Note, the use of EDRS_CLASS_TYPE in the implementation. That is just typed to a 32 bit integer. It should be relatively easy to make it a 64 bit integer if needed, but there are a few (marked) places in the code that assume 32 bits.

A class in the route server 705 is also simply a means of marking a particular route from a particular peer as belonging to a particular set of routes that will be imported into another peer's view. The intended use of this is so that an ISP could mark, for example, some routes as "paid peering" routes and some as "transit" routes, or some as "Europe" and some as "North America", and only have the routes purchased by the buyer imported into the buyer's view.

The class_mesh is a global N×N array of EDRS_CLASS_TYPE variables, and is designed to hold the information about which announcements are sent to which peers. The notion of class membership gives finer control over which portion of one peer's routes that another peer will be sent due to using the classes for route filtering.

Each slot in the class_mesh is a bitmask which represents the peers and classes that each peer is eligible to receive routes from. Since each BGPattr has a class field, it's a simple check in update_process_peer( ) that allows EDRS to determine whether a particular prefix should be sent to a particular peer:

```
/* check to see if the class is being imported */
if ((attr->class & class_mesh [attr->peerid][peerid]) == 0)
    continue;
```

Note that this is a bitwise AND (&), not a Boolean operation (&&). Each slot in class_mesh is set in the function view_change_slot( ), which is called during garbage collection.

In one embodiment, the software used to facilitate any of the algorithms routines, structures, etc. described above can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. An apparatus, comprising:
a route server having code programmed to connect to network elements from a plurality of Internet network service providers (ISP's) to the network elements of a plurality of users through the route server, wherein the route server also has code programmed to maintain multiple views of a routing table as well as implement multiple Border Gateway Protocol (BGP) instances, each instance representing a different autonomous system, in a single instance of the route server, wherein also the route server having code programmed to match a first user to one or more of the Internet network service providers based on criteria provided by both the first user and the plurality of Internet network service providers including that the first user can select from not only the best possible routes of each Internet network service but a full listing of all possible routes to a destination address from each Internet network service matching the first user's criteria in order to construct a route table to get IP packets of the first user to the destination address, wherein any portions of the route server implemented in software code are stored on a non-transitory machine-readable medium in an executable format, wherein the route server is coded as a multiple threaded daemon, and the multiple threaded daemon consists of a main thread and four or more independent persistent threads, which include
a read thread that has code programmed to handle all Transmission Control Protocol (TCP) traffic from peers, accept new TCP connections, and detect failed connections,
a write thread that has code programmed to send actual data packets to peer connections,
an update thread that has code programmed to decide which prefixes need to be advertised or withdrawn to each BGP peer, and
a route table thread that has code programmed to maintain a single route table which is maintained for all peers by being an only persistent thread with both read and write access to the route table, wherein the route table thread is the only persistent thread that can write into the route table in order to allow fast access by all threads to the route table by allowing the other independent persistent threads an ability to read from the route table at the same time and not having to lock threads because only the route table thread can make changes to the route table.

2. The apparatus of claim 1, wherein the first user's criteria includes a subset of possible Internet network service providers and the route server also has code programmed to bring up one or more additional BGP peering sessions between the route server and the network elements of the first user to receive full transit routes from each Internet network service provider in the subset that the first user has selected.

3. The apparatus of claim 2, wherein the route server also has code programmed to apply filters on these full transit routes to either filter in, filter out, or filter in and out particular route prefixes from the full transit routes that match the first users' criteria on filtering network transit paths.

4. The apparatus of claim 2, wherein the additional BGP peering sessions establish bidirectional communications between the route server and the network elements of the first user for a per-provider BGP peering session in which the network elements of the first user are able to announce different information to one or more of the ISPs back through the additional BGP peering sessions than the information announced back through a main BGP peering session with the route server.

5. The apparatus of claim 2, wherein the route server also has code programmed to present a user interface to the first user to gather the first users' criteria and match the first users' criteria to information provided by the ISPs to automatically provision ISP services to the first user based on criteria provided by both the first user and the ISPs.

6. The apparatus of claim 1, wherein the route server also has code programmed to support multiple instances of BGP talking to the same peers where each BGP instance has its own Router ID, listens on a different IP address and TCP socket, and all BGP instances are part of a same BGP Autonomous System Number, wherein the route server uses the multiple instances of BGP for the per-provider BGP sessions, where buyers can peer with a separate IP address and get merely those routes sent by a particular ISP.

7. The apparatus of claim 1, wherein the persistent independent threads communicate with each other via queue structures passed between each other and condition variables, and then pipeline the queue structures and use flags to achieve scalability.

8. The apparatus of claim 1, wherein the route server has the route table, which is a hybrid combination of a linked list and B-tree, having a pre-balanced organization by net mask length for each root and then a field entry for every possible prefix within that root of net mask lengths to make sure that the route table never needs to be rebalanced during run time, and wherein every announced route is kept permanently in a pre-allocated memory space of the route table to enable no reason to add or delete existing routes in the route table when a new BGP session is established; rather, just change some attributes associated with a given prefix by an updating of some pointers.

9. The apparatus of claim 1, wherein the route server has the route table, which is a hybrid combination of a linked list and B-tree, wherein the route table has a bounded maximum depth to allow scanning by a non-recursive algorithm, and
    data handling done by the route server consists of passing around read-only pointers into the route table, wherein when the route table needs to be scanned to create route lists for sending to other threads, the non-recursive algorithm used with the known bounded maximum depth eliminates any extra function-call overhead which would be required by a recursive algorithm.

10. The apparatus of claim 1, wherein the route server has the route table, which is a hybrid combination of a linked list and B-tree, wherein a construction of the route table is such that each root of the B-tree handles routes of specific netmask lengths and when a route that is already in the route table comes into the route server, no new route structure is allocated, and a new BGP attribute is only allocated if the BGP attributes of this route are not the same as any other prefix announced by this peer.

11. The apparatus of claim 1, wherein when information needs to be shared, threads other than the route thread can read from the route table via route lists passed from the route thread, wherein the route and its announcements are placed into a route list and communicated to one of the other persistent threads, then that other persistent thread is allowed to read any pointers placed into the route list knowing that they will still exist, and the communicated route list prevents the other persistent threads from needing to scan the route table itself, which may be changing and could send a thread off into unallocated space.

12. The apparatus of claim 1, wherein the route server also has code programmed to recycle queues by maintaining a pool of queue entries to reduce an amount of memory allocation activity that causes thread locking, and all new entries in the pool of queue entries are added to a reuse list.

13. The apparatus of claim 1, wherein the route server also has code programmed to make better use of cache loads by keeping frequently used sequentially used global variables near each other in a memory in a single file.

14. The apparatus of claim 1, wherein the route server maintains the multiple views of the routing table, where each view of the routing table is a custom view of the routing table that the route server wants that peer to see.

15. The apparatus of claim 1, wherein the route server maintains a view of a group of peers in an autonomous system whose routes are considered together, in which the view has also a plurality of classes associated with that view where each of the routes considered together is in zero or more of a plurality of classes and the routes considered together are assigned to classes based on networking attribute criteria.

16. The apparatus of claim 1, wherein the route server also has code programmed to support classification of routes at input time with views and classes, where each view defines a number of classes and a route can belong to one or more classes and the classes are used for differing classes of service which a given ISP offers.

17. A method for a route server, comprising:
    connecting network elements from a plurality of Internet network service providers to network elements of a plurality of users through the route server; maintaining multiple views of a routing table, each view the route server wants each of its peers to see as well as implementing multiple BGP instances, representing different autonomous systems in a single instance of the route server;
    matching a first user to one or more of the Internet network service providers based on criteria provided by both the first user and the plurality of Internet network service providers including the first user can select from not only the best possible routes of each Internet network service but a full listing of all possible routes to a destination address from each Internet network service matching the first user's criteria in order to construct a route table to get IP packets of the first user to a destination address, wherein the first user's criteria may include a subset of the possible Internet network service providers;
    bringing up one or more additional BGP peering sessions between the route server and the network elements of the first user to receive full transit routes from each Internet network service providers in the subset that the first user has selected;
    establishing bidirectional communications in the additional BGP peering sessions between the route server and the network elements of the first user for per provider sessions in which the network elements of the first user are able to announce different information to one or more of the ISPs back through the additional BGP peering sessions then information announced back through a main BGP session;

locating a route in the route table initially by specific prefix length, wherein the route table has pre-allocated memory space for all possible prefixes in the routing table;

not deleting a route in the route table once entered into the route table even if that route is no longer being announced; and allocating a new BGP attribute only if the BGP attributes of this route are not the same as any other prefix announced by this peer.

18. The method of claim 17, further comprising:

supporting classification of routes at input time with views and classes, where each view defines a number of classes and a route can belong to one or more classes and the classes are used for differing classes of service which a given Internet network service provider offers and merely a set of routes in a given class is imported into another peer's view of the routing table.

* * * * *